(12) United States Patent
Kuroda et al.

(10) Patent No.: US 12,560,841 B2
(45) Date of Patent: Feb. 24, 2026

(54) LIQUID CRYSTAL DISPLAY DEVICE AND MANUFACTURING METHOD THEREFOR

(71) Applicant: JSR CORPORATION, Tokyo (JP)

(72) Inventors: Yoshihiko Kuroda, Tokyo (JP); Koichi Miyachi, Tokyo (JP)

(73) Assignee: JSR CORPORATION, Tokyo (JP)

( * ) Notice: Subject to any disclaimer, the term of this patent is extended or adjusted under 35 U.S.C. 154(b) by 0 days.

(21) Appl. No.: 18/685,497

(22) PCT Filed: Aug. 22, 2022

(86) PCT No.: PCT/JP2022/031598
§ 371 (c)(1),
(2) Date: Feb. 21, 2024

(87) PCT Pub. No.: WO2023/027035
PCT Pub. Date: Mar. 2, 2023

(65) Prior Publication Data
US 2024/0393644 A1 Nov. 28, 2024

(30) Foreign Application Priority Data

Aug. 27, 2021 (JP) ................................. 2021-139191

(51) Int. Cl.
*G02F 1/1337* (2006.01)
*G02F 1/1335* (2006.01)
*G02F 1/137* (2006.01)
(52) U.S. Cl.
CPC .. *G02F 1/133753* (2013.01); *G02F 1/133528* (2013.01); *G02F 1/133707* (2013.01);
(Continued)
(58) Field of Classification Search
CPC ......... G02F 1/133753; G02F 1/133528; G02F 1/133707; G02F 1/133757; G02F 1/133761; G02F 1/133788; G02F 1/13712
See application file for complete search history.

(56) References Cited

U.S. PATENT DOCUMENTS

2004/0218137 A1* 11/2004 Lee ................... G02F 1/133753
349/178
2010/0157223 A1* 6/2010 Shin .................. G02F 1/133788
349/187
(Continued)

FOREIGN PATENT DOCUMENTS

JP 2010146008 7/2010
JP 2011085738 4/2011
(Continued)

OTHER PUBLICATIONS

"International Search Report (Form PCT/ISA/210) of PCT/JP2022/ 031598", mailed on Oct. 4, 2022, with English translation thereof, pp. 1-4.
(Continued)

*Primary Examiner* — Phu Vu
(74) *Attorney, Agent, or Firm* — JCIPRNET

(57) ABSTRACT
A first and/or second alignment film is a photo-alignment film on which alignment division is performed. Each pixel has multiple alignment regions having different alignment directions of liquid crystal molecules of a liquid crystal layer by the alignment division. The number of times of exposure in each alignment region for the alignment division is two or more and the same number among the regions; in each time of exposure for the alignment division, exposure is performed on two or more alignment regions along an arrangement direction, the previous numbers of times of exposure in alignment regions to be exposed in each times of exposure are the same among the regions; and the angle formed by the alignment direction of the liquid crystal molecules of the liquid crystal layer in each region of the alignment regions and a direction where the polarizing axis of a polarizing plate extends is 45°.

9 Claims, 33 Drawing Sheets

(52) U.S. Cl.
    CPC .. *G02F 1/133757* (2021.01); *G02F 1/133761*
          (2021.01); *G02F 1/133788* (2013.01); *G02F*
                           *1/13712* (2021.01)

(56)              References Cited

U.S. PATENT DOCUMENTS

2019/0324302 A1 *  10/2019  Fujiwara ........... G02F 1/133788
2020/0379302 A1 *  12/2020  Hirata .............. G02F 1/134345

FOREIGN PATENT DOCUMENTS

| JP | 2012008521 | 1/2012 | |
| JP | 5184618 | 4/2013 | |
| WO | 2017057208 | 4/2017 | |
| WO | WO-2020226008 A1 * | 11/2020 | ........ G02F 1/133711 |

OTHER PUBLICATIONS

"Notice of Reasons for Refusal of Japan Counterpart Application", issued on Jul. 8, 2025, with English translation thereof, pp. 1-8.

* cited by examiner

LIQUID CRYSTAL DISPLAY DEVICE AND MANUFACTURING METHOD THEREFOR

CROSS-REFERENCE TO RELATED APPLICATION

This application is a 371 application of the International PCT application serial no. PCT/JP2022/031598, filed on Aug. 22, 2022, which claims the priority benefits of Japan Patent Application No. 2021-139191, filed on Aug. 27, 2021. The entirety of each of the above-mentioned patent applications is hereby incorporated by reference herein and made a part of this specification.

CROSS-REFERENCE TO RELATED APPLICATION

The present disclosure relates to a liquid crystal display device and a manufacturing method therefor.

BACKGROUND ART

For liquid crystal displays, specifically liquid crystal display panels for large-sized televisions, a viewing angle, a transmittance, a response time and the like are important performance indicators. As liquid crystal display modes for improving values of these performance indicators, various modes such as a 4Domain-Reverse Twisted Nematic (4D-RTN) mode, a Polymer Sustained Alignment (PSA) mode, an In Plane Switching (IPS) mode, and a Fringe Field Switching (FFS) mode have been developed (for example, refer to Patent Literature 1). Currently, large-sized televisions using these liquid crystal display mode technologies are mass-produced.

In recent years, 4K (3840×2160 pixels) and 8K (7680×4320 pixels) televisions with higher definition than previous high-definition televisions (1920×1080 pixels) have been realized. However, in 4K or 8K liquid crystal display panels, the panel transmittance tends to decrease due to an increase in the number of wirings and switching elements and the like. When the panel transmittance decreases, the light utilization efficiency of the backlight decreases, which leads to an increase in power consumption.

In order to address such problems, Patent Literature 2 discloses a technology utilizing a 4Domain-Electrically Controlled Birefringence (4D-ECB) mode in order to improve the transmittance of 4D-RTN using a photo-alignment film. Patent Literature 2 proposes that, when a partial region of one pixel or a half pixel divided into four is subjected to double exposure and a slit electrode is used, the dark line becomes finer and finger pushing resistance is improved.

CITATION LIST

Patent Literature

[Patent Literature 1]
Japanese Patent No. 5184618
[Patent Literature 2]
PCT International Publication No. WO2017/057208

SUMMARY OF INVENTION

Technical Problem

While the technology described in Patent Literature 2 was expected to be able to improve transmittance characteristics and finger pushing resistance of the liquid crystal display device, the inventors examined and found that, in the liquid crystal display device of Patent Literature 2, flicker is likely to occur during driving and a variation occurs in the response speed of liquid crystal molecules. In order to obtain a liquid crystal display device of higher quality than ever before, it is necessary to improve transmittance characteristics and finger pushing resistance and to sufficiently mitigate the occurrence of flicker and a variation in a response speed of liquid crystal molecules.

The present disclosure has been made in view of the above circumstances, and a main objective of the present disclosure is to provide a liquid crystal display device which has excellent transmittance characteristics and finger pushing resistance and can mitigate the occurrence of flicker and a variation in a response speed of liquid crystal molecules.

Solution to Problem

In order to address the above problems, the present disclosure provides the following aspects.

[1] A liquid crystal display device having a plurality of pixels, including:
a first substrate including a pixel electrode;
a second substrate which is arranged to face the first substrate and includes a counter electrode;
a liquid crystal layer which is arranged between the first substrate and the second substrate and includes liquid crystal molecules having negative dielectric anisotropy;
a first alignment film formed on the first substrate;
a second alignment film formed on the second substrate; and
a pair of polarizing plates arranged outside the first substrate and the second substrate,
wherein the pixel electrode has a slit,
wherein at least one of the first alignment film and the second alignment film is a photo-alignment film whose alignment is divided by performing a plurality of exposures on a photosensitive organic film,
wherein each pixel has a plurality of alignment regions in which directions in which a long axis direction of liquid crystal molecules present near the center of the liquid crystal layer in the thickness direction is projected onto the first substrate are different from each other due to the alignment division,
wherein the number of exposures for each of the plurality of alignment regions for the alignment division is plural and the same among the regions.
wherein, in each exposure for the alignment division, exposure is performed on two or more alignment regions in the arrangement direction, and the previous numbers of exposures in alignment regions to be exposed in each exposure are the same among the regions, and
wherein an angle formed by a direction in which a long axis direction of liquid crystal molecules present near the center of the liquid crystal layer in the thickness direction in each of the plurality of alignment regions is projected onto the first substrate and a direction in which the polarizing axis of the polarizing plate extends is approximately 45°.

[2] A liquid crystal display device having a plurality of pixels, including:
a first substrate including a pixel electrode;
a second substrate which is arranged to face the first substrate and includes a counter electrode;

a liquid crystal layer which is arranged between the first substrate and the second substrate and includes liquid crystal molecules having negative dielectric anisotropy;

a first alignment film formed on the first substrate;

a second alignment film formed on the second substrate; and a pair of polarizing plates arranged outside the first substrate and the second substrate, wherein the liquid crystal layer contains a chiral agent, wherein at least one of the first alignment film and the second alignment film is a photo-alignment film whose alignment is divided by performing a plurality of exposures on a photosensitive organic film, wherein each pixel has a plurality of alignment regions in which directions in which a long axis direction of liquid crystal molecules present near the center of the liquid crystal layer in the thickness direction is projected onto the first substrate are different from each other due to the alignment division, wherein the number of exposures for each of the plurality of alignment regions for the alignment division is plural and the same among the regions, wherein, in each exposure for the alignment division, exposure is performed on two or more alignment regions in the arrangement direction, and the previous numbers of exposures in alignment regions to be exposed in each exposure are the same among the regions, and wherein an angle formed by a direction in which a long axis direction of liquid crystal molecules present near the center of the liquid crystal layer in the thickness direction in each of the plurality of alignment regions is projected onto the first substrate and a direction in which the polarizing axis of the polarizing plate extends is approximately 45°.

[3] A method for manufacturing the liquid crystal display device according to [1] or [2], including:

a film formation process in which a photosensitive organic film is formed on at least one of the first substrate and the second substrate; and a photo-alignment treatment process in which a plurality of exposures are performed on the organic film, and thus a photo-alignment film whose alignment is divided is obtained so that a plurality of alignment regions in which directions in which a long axis direction of liquid crystal molecules present near the center of the liquid crystal layer in the thickness direction is projected onto the first substrate are different from each other are formed, wherein, in the photo-alignment treatment process, exposure is performed such that the number of exposures for each of the plurality of alignment regions for the alignment division is plural and the same among the regions, and in each exposure for the alignment division, exposure is performed on two or more alignment regions in the arrangement direction, and the previous numbers of exposures in alignment regions to be exposed in each exposure are the same among the regions.

Advantageous Effects of Invention

According to the present disclosure, it is possible to obtain a liquid crystal display device which has excellent transmittance characteristics and finger pushing resistance and can mitigate the occurrence of flicker and a variation in a response speed of liquid crystal molecules.

DESCRIPTION OF EMBODIMENTS

Figure 1:
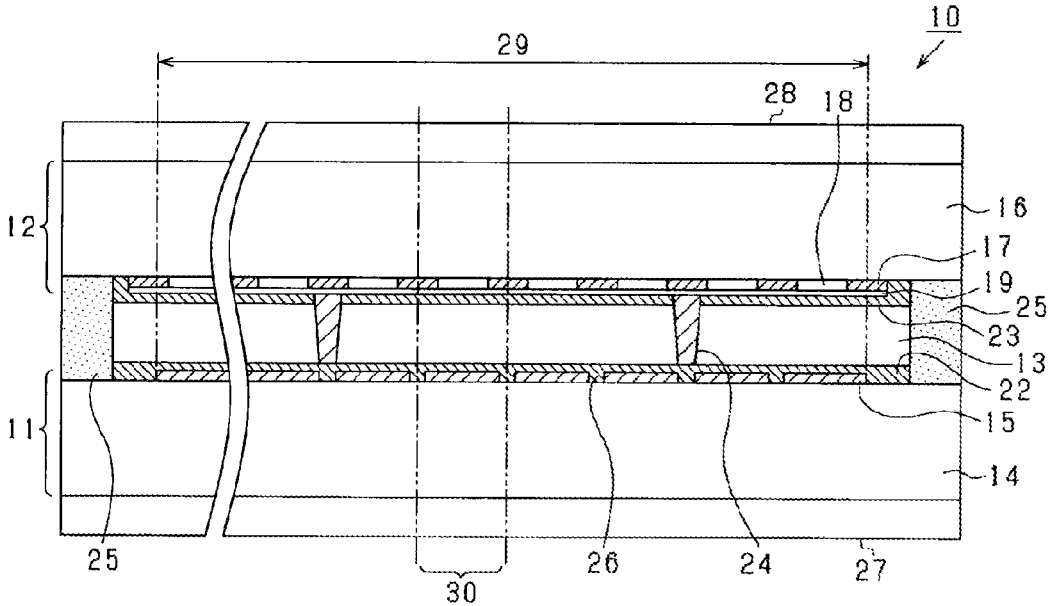
FIG. 1 is a schematic view showing a schematic configuration of a liquid crystal display device.

Embodiments will be described below with reference to the drawings. Hereinafter, in the following respective embodiments, the same or equivalent components will be denoted with the same reference numeral S in the drawings and the same description will be applied for components with the same reference numeral S. In the following description, for convenience, the up, down, left, and right directions are shown based on the direction in which a display region of a liquid crystal display device is viewed from the front.

In this specification, a "pixel" is the minimum unit for expressing a shade (gradation) of each color in a display, and corresponds to, for example, a unit for expressing respective gradations of R, G and B, in a color filter type display element. Therefore, the expression "pixel" refers to R pixels, G pixels and B pixels, individually rather than color display pixels (pixel elements) in which an R pixel, a G pixel and a B pixel are combined. That is, in the case of a color liquid crystal display element, one pixel corresponds to any color of a color filter. The "pretilt angle" is an angle formed by a surface of an alignment film and a liquid crystal molecule near the alignment film in a long axis direction when no voltage is applied to a liquid crystal layer.

"Direction" is an orientation on a surface of a substrate or a plane parallel to a surface of a substrate. However, the direction does not consider an inclination angle with respect to a normal direction of a surface of a substrate. Unless there is a specific description regarding the reference, for a direction expressed from 0 to 360 degrees, a direction angle in the x-axis direction in the horizontal direction of the display surface (that is, a horizontal direction of a display surface, also referred to as a "pixel horizontal direction") is a reference direction (0 degrees), and the counterclockwise direction is a positive angle.

"Alignment direction of liquid crystal molecules in the liquid crystal layer" is a direction in which the starting point is a longitudinal end on the side of a substrate (a first substrate) in which pixel electrodes are arranged and the end point is a longitudinal end on the side of the other substrate (a second substrate) in liquid crystal molecules present near the center of the liquid crystal layer in the thickness direction (more specifically, liquid crystal molecules present near the center of the layer plane in the liquid crystal layer of each pixel and near the center of the liquid crystal layer in the thickness direction). Therefore, "the direction in which the long axis direction of liquid crystal molecules present near the center of the liquid crystal layer in the thickness direction is projected onto the first substrate" is an orientation in which the direction in which the starting point is a longitudinal end on the side of the first substrate and the end point is a longitudinal end on the side of the second substrate in liquid crystal molecules present near the center of the liquid crystal layer in the thickness direction is projected onto the first substrate.

"The tilt direction of liquid crystal molecules" is a direction of liquid crystal molecules present near the alignment film, which is controlled by the liquid crystal alignment film when no voltage is applied and is a direction in which the starting point is a longitudinal end on the side of the first substrate and the end point is a longitudinal end on the side of the second substrate. In this specification, when a particular visual direction is not indicated, it indicates a direction toward the side of the first substrate from the side of the second substrate (front view).

First Embodiment

<Liquid Crystal Display Device>

A liquid crystal display device 10 is a thin film transistor (TFT) type liquid crystal display device, and has a plurality of pixels 30 arranged in a matrix in a display region 29 that displays an image. As shown in FIG. 1, the liquid crystal display device 10 includes a pair of substrates including a first substrate 11 and a second substrate 12, and a liquid crystal layer 13 arranged between the first substrate 11 and the second substrate 12. Here, a case in which the present embodiment is applied to a TFT type liquid crystal display device will be described, but the present disclosure may be applied to other drive methods (for example, a passive matrix method, a plasma address method, etc.).

The first substrate 11 is a TFT substrate in which, on a surface of a transparent substrate 14 made of glass, a resin or the like on the side of the liquid crystal layer 13, a pixel electrode 15 made of a transparent conductor such as Indium Tin Oxide (ITO), a TFT as a switching element, and various wirings such as a scanning line and a signal line are arranged. The second substrate 12 is a counter substrate in which, on a surface of a transparent substrate 16 made of glass, a resin or the like on the side of the liquid crystal layer 13, a counter electrode 19 made of a transparent conductor is provided. The counter electrode 19 is a common electrode that is common to all pixel electrodes 15. The second substrate 12 in the present embodiment is a CF substrate including a black matrix 17 and a color filter 18. Here, instead of a configuration in which the color filter 18 is provided on the side of the counter substrate, a color filter on array (COA) in which the color filter 18 is provided on the side of a pixel substrate may be used.

In the first substrate 11 and the second substrate 12, a liquid crystal alignment film for aligning liquid crystal molecules near a surface of a substrate in a predetermined direction with respect to the surface of the substrate (that is, an electrode arrangement surface) is formed. The liquid crystal alignment film is a vertical alignment film that aligns liquid crystal molecules almost vertically when no voltage is applied. The liquid crystal display device 10 includes, as liquid crystal alignment films, a first alignment film 22 formed on the electrode arrangement surface of the first substrate 11 and a second alignment film 23 formed on the electrode arrangement surface of the second substrate 12.

At least one of the first alignment film 22 and the second alignment film 23 is a photo-alignment film. The photo-alignment film is a liquid crystal alignment film formed by performing a photo-alignment treatment on the photosensitive organic film formed on a substrate using a polymer composition containing a polymer having a photoalignable structure (liquid crystal alignment agent). Here, light emitted to the organic film in order to obtain a photo-alignment film may be polarized light or non-polarized light. The polymer having a photoalignable structure is not particularly limited, and any known polymer component for the photo-alignment film can be used. Specific examples of photoalignable structures include a cinnamic acid structure, an azobenzene structure, a coumarin structure, a chalcone structure and a cyclobutane structure. Examples of main chains of the polymer having a photoalignable structure include polyamic acid, polyimide, polyorganosiloxane, polyamic acid ester, polyamide, polyenamine, (meth)acrylic polymers, styrene polymers, maleimide polymers, and styrene-maleimide polymers. Here, the term "(meth)acryl" includes "acryl" and "methacryl."

Here, the liquid crystal alignment agent for forming the first alignment film 22 and the second alignment film 23 may contain, as the polymer component, only one type of polymer, or two or more types of polymers. The liquid crystal alignment agent is generally a liquid composition in which the polymer component is dissolved or dispersed one, two or more solvents. The liquid crystal alignment agent may further contain, for example, additives such as a crosslinking agent, an adhesion aid, an ultraviolet absorber, and a photosensitizer.

The first substrate 11 and the second substrate 12 are arranged with a predetermined gap (cell gap) therebetween and a spacer 24 therebetween so that the electrode arrangement surface of the first substrate 11 faces the electrode arrangement surface of the second substrate 12. Here, while FIG. 1 shows a case in which the spacer 24 is a columnar spacer, other spacers for liquid crystal display devices such as a bead spacer may be used. The first substrate 11 and the second substrate 12, which are arranged to face each other, are bonded to each other via a sealing member 25 at their peripheral parts. When a liquid crystal composition is filled into the space surrounded by the first substrate 11, the second substrate 12 and the sealing member 25, the liquid crystal layer 13 is formed between the first substrate 11 and the second substrate 12. The liquid crystal layer 13 contains a liquid crystal having negative dielectric anisotropy.

As the liquid crystal, a known liquid crystal material having negative dielectric anisotropy can be used. The refractive indicator anisotropy $\Delta n$ of the liquid crystal can be appropriately set so that the retardation $(d \cdot \Delta)$ expressed as the product of the refractive indicator anisotropy $\Delta n$ of the liquid crystal and the thickness d of the liquid crystal layer 13 becomes a desired value.

A pair of polarizing plates are arranged outside the first substrate 11 and the second substrate 12. The pair of polarizing plates include a first polarizing plate 27 provided on the side of the first substrate 11 and a second polarizing plate 28 provided on the side of the second substrate 12. In the liquid crystal display device 10, the first polarizing plate 27 and the second polarizing plate 28 are arranged so that their polarizing axes are perpendicular to each other. A terminal region (not shown) is provided at the outer edge of the first substrate 11. A driver IC for driving a liquid crystal and the like are connected to the terminal region, and thus the liquid crystal display device 10 is driven.

A plurality of pixels 30 included in the liquid crystal display device 10 are arranged in a matrix including a plurality of rows and a plurality of columns. In the liquid crystal display device 10, a stripe arrangement is used as an arrangement pattern of the color filter 18. Therefore, the plurality of pixels 30 are arranged in stripes so that the pixels of the same color extend in one of the row direction and the column direction and are arranged so that the pixels of different colors are adjacent to each other in the other direction. As an example, the color filters 18 are arranged in the order of red (R), green (G), and blue (B) in each column.

(Pixel Structure)

Next, the pixel structure of the liquid crystal display device 10 will be described. Each pixel 30 has a plurality of alignment regions (hereinafter referred to as "liquid crystal domains") in which the alignment directions of liquid crystal molecules in the liquid crystal layer 13 are different. Thereby, a viewing angle characteristic of the liquid crystal display device 10 is compensated. In each pixel 30, four liquid crystal domains (a first domain 31 to a fourth domain 34) are formed in a half pixel 30_a_ (that is, half of one pixel) by exposing the photosensitive organic film formed on the substrate a plurality of times in different directions (refer to FIG. 2). Thereby, alignment division is performed to change the direction in which liquid crystal molecules within the pixel fall. In the alignment division process of the present embodiment, the number of exposures to impart a desired tilt direction to the photosensitive organic film belonging to each of the four liquid crystal domains is plural in each domain and the same number for each domain. Hereinafter, respective embodiments will be described in detail.

Figure 2:
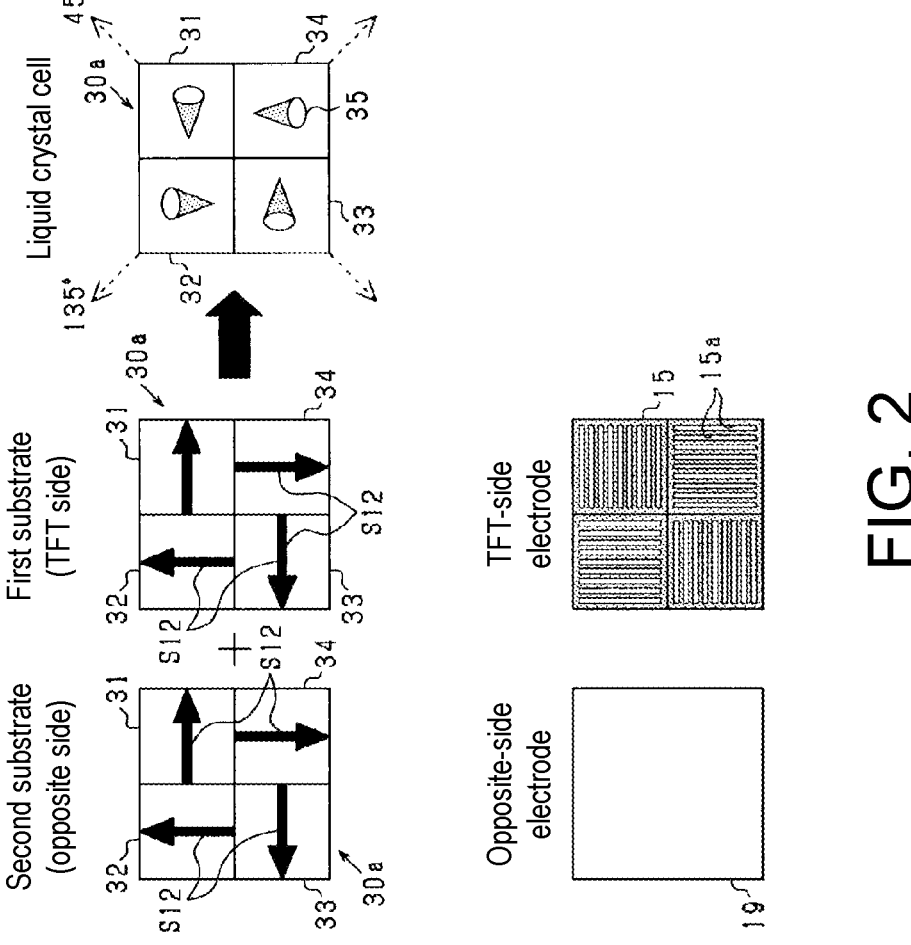
FIG. 2 is a schematic view showing a tilt direction and an alignment direction in a half pixel included in a liquid crystal display device of a first embodiment.

FIG. 2 shows four liquid crystal domains forming the half pixel 30_a_ included in a liquid crystal display device 10 of a first embodiment, and an electrode structure. In FIG. 2, an arrow with the reference numeral S12 indicates a tilt direction of each liquid crystal domain imparted to the photosensitive organic film according to a plurality of exposure treatments (that is, the tilt direction of the photo-alignment film). The cone with the reference numeral 35 indicates liquid crystal molecules. In the liquid crystal molecule 35, the top side of the cone indicates the side of the first substrate 11, and the bottom side of the cone indicates the side of the second substrate 12. In the first embodiment, the liquid crystal layer 13 of the liquid crystal display device 10 does not contain a chiral agent (the same applies to the second embodiment to the fourth embodiment).

Figure 3:
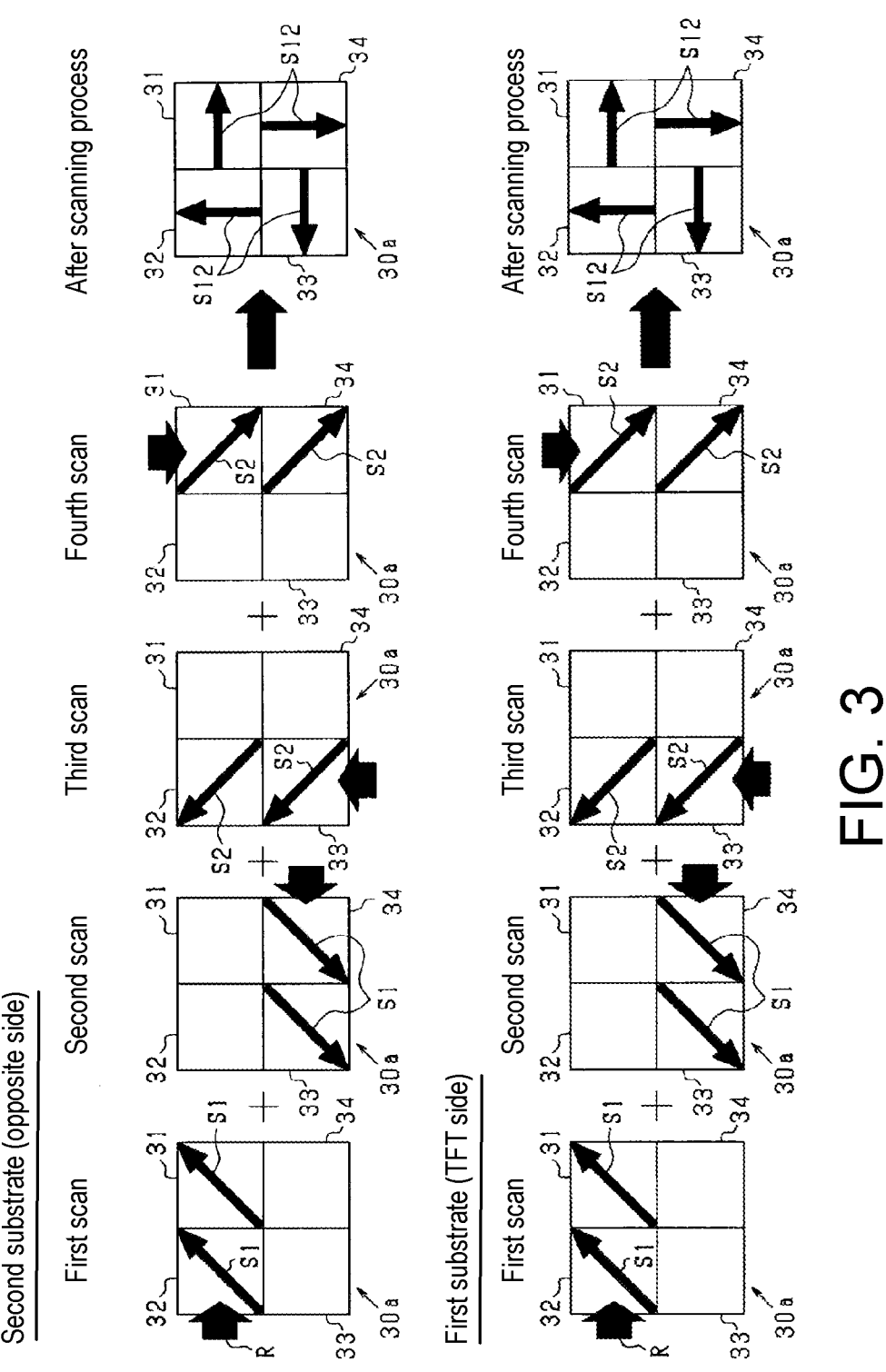
FIG. 3 is a schematic view showing an exposure process in a half pixel included in the liquid crystal display device of the first embodiment.

Here, one pixel in the present embodiment is formed by two half pixels 30_a_ shown in FIG. 2 and FIG. 3 arranged side by side in the vertical direction, but may be formed by two half pixels 30_a_ arranged side by side in the lateral direction.

The half pixel 30_a_ included in the liquid crystal display device 10 of the first embodiment includes four liquid crystal domains: the first domain 31, the second domain 32, the third domain 33 and the fourth domain 34, and these four liquid crystal domains 31 to 34 are arranged side by side two each in the vertical direction and the horizontal direction. The first domain 31 to the fourth domain 34 are arranged counterclockwise in order within the half pixel 30a when the side of the TFT substrate is viewed from the side of the counter substrate.

In the liquid crystal display device 10 of the first embodiment, both the first alignment film 22 and the second alignment film 23 are photo-alignment films in which a different tilt direction is imparted to each of the plurality of domains by alignment division, and the pretilt angles defined by the photo-alignment films are each less than 90 degrees. That is, in each liquid crystal domain provided in the pixel 30, liquid crystal molecules near each alignment film are defined by the first alignment film 22 and the second alignment film 23 to have a pretilt angle of less than 90 degrees and a different tilt direction among the liquid crystal domains. The tilt direction of liquid crystal molecules is, on both the side of the first substrate 11 and the side of the second substrate 12, 0° in the first domain 31, 90° in the second domain 32, 180° in the third domain 33, and 270° in the fourth domain 34 (refer to FIG. 2).

The pixel electrode 15 provided on the side of the first substrate 11 (also referred to as the side of TFT) is a slit electrode, and a plurality of slits 15a extending in a direction parallel to the alignment direction (tilt direction) of liquid crystal molecules near the first alignment film 22 are formed. More specifically, as shown in FIG. 2, in the first domain 31 and the third domain 33, a slit extending in the 0° direction (that is, in the lateral direction of the pixel 30) is formed, and in the second domain 32 and the fourth domain 34, a slit extending in the 90° direction (that is, in the longitudinal direction of the pixel 30) is formed. On the other hand, the counter electrode 19 provided on the side of the second substrate 12 (also referred to as the opposite side) is a planar electrode (solid electrode) without a slit 15a.

In such a half pixel 30a included in the liquid crystal display device 10 of the first embodiment, the alignment directions of liquid crystal molecules in the liquid crystal layer 13 are different among the liquid crystal domains. Specifically, as shown in "liquid crystal cell" in FIG. 2, the angle differs among the liquid crystal domains by an integer multiple of 90°, and is 0° in the first domain 31, 90° in the second domain 32, 180° in the third domain 33, and 270° in the fourth domain 34.

One of the polarizing axis of the first polarizing plate 27 and the polarizing axis of the second polarizing plate 28 extends in the 45° direction, and the other extends in the 135° direction. Here, in FIG. 2, the direction of the polarizing axis is indicated by a broken line arrow. Therefore, in the liquid crystal display device 10, in each of the first domain 31 to the fourth domain 34, the angle formed by the alignment direction (0°, 90°, 180°, and 270° direction) of liquid crystal molecules in the liquid crystal layer 13 and the direction in which the polarizing axes of the pair of polarizing plates (the first polarizing plate 27 and the second polarizing plate 28) extend is approximately 45°. Here, the angle formed by the alignment direction of liquid crystal molecules in the liquid crystal layer 13 and the direction in which the polarizing axis extends is an angle on the side of an acute angle.

The photo-alignment treatment when the first alignment film 22 and the second alignment film 23 are formed is performed by dividing exposure in which a plurality of exposures are performed on the photosensitive organic film, and for each divided region (the first domain 31 to the fourth domain 34), the alignment direction of liquid crystal molecules in the liquid crystal layer 13 is different. Specifically, for each of the photosensitive organic film that becomes the first alignment film 22 and the photosensitive organic film that becomes the second alignment film 23, each liquid crystal domain of the first domain 31 to the fourth domain 34 is exposed twice (that is, double exposure). Note that, hereinafter, the initial exposure in each liquid crystal domain will be referred to as a "first exposure" and the second exposure will be referred to as a "second exposure."

FIG. 3 shows an outline of the exposure process of the photo-alignment treatment when the liquid crystal display device 10 of the first embodiment is manufactured. In FIG. 3, an arrow (thick arrow) with the reference numeral R indicates a scan direction, an arrow (thin arrow) with the reference numeral S1 indicates a tilt direction of liquid crystal molecules imparted by the first exposure, and an arrow (thin arrow) with the reference numeral S2 indicates a tilt direction of liquid crystal molecules imparted by the second exposure.

Here, in the exposure process in FIG. 3, the directions of the arrows of the reference numerals S1 and S2 shown in the half pixel 30a indicate a tilt direction when the scan exposure performed previously is not considered (hereinafter referred to as a "target tilt direction"). The direction of the arrow of the reference numeral S12 shown in the half pixel 30a after the scanning process is a tilt direction of liquid crystal molecules imparted to the photosensitive organic film (that is, the tilt direction of liquid crystal molecules imparted by the photo-alignment film) after a plurality of scan exposures are performed.

In the exposure process of the photo-alignment treatment, as shown in FIG. 3, for each substrate, a total of four scan exposures, from the first scan to the fourth scan, are performed. In this case, in each exposure from the first scan to the fourth scan, light is emitted to two domains in the arrangement direction of the liquid crystal domains 31 to 34. For example, when a photo-alignment film is formed on the first substrate 11, as shown in FIG. 3, first, with respect to the first domain 31 and the second domain 32 arranged adjacent to each other in the pixel horizontal direction, the transmission axis direction of the polarizer of the exposure device is set in a direction in which the tilt direction of liquid crystal molecules is 45°, and scan exposure is performed (first scan). Subsequently, with respect to the third domain 33 and the fourth domain 34 arranged adjacent to each other in the pixel horizontal direction, the polarizer of the exposure device is rotated in a direction in which the tilt direction of liquid crystal molecules is 225°, and scan exposure is performed (second scan). In addition, with respect to the second domain 32 and the third domain 33 arranged adjacent to each other in the pixel vertical direction, the polarizer of the exposure device is rotated in a direction in which the tilt direction of liquid crystal molecules is 135°, and scan exposure is performed (third scan). Finally, with respect to the first domain 31 and the fourth domain 34 arranged adjacent to each other in the pixel vertical direction, the polarizer of the exposure device is rotated in a direction in which the tilt direction of liquid crystal molecules is 315°, and scan exposure is performed (fourth scan). Through such an exposure treatment according to a plurality of scans, the tilt direction of liquid crystal molecules in each liquid crystal domain of the first domain 31 to the fourth domain 34 is set to differ by an integer multiple of 90° between the domains, such as 0°. 90°, 180°, and 270° (refer to "after scanning process" in FIG. 3).

Formation of a photo-alignment film formed on the second substrate 12 is the same as that of the first substrate 11. That is, when the photosensitive organic film formed on the second substrate is subjected to a total of four scan exposures, the tilt directions of liquid crystal molecules in the liquid crystal domains of the first domain 31 to the fourth domain 34 are 0°, 90°, 180°, and 270° (after exposure treatment in FIG. 3).

In the exposure process of the photo-alignment treatment shown in FIG. 3, for the photosensitive organic film formed on each substrate, the regions corresponding to the domains 31 to 34 are exposed twice in the first exposure and the second exposure, and thereby, the alignment directions of liquid crystal molecules in the liquid crystal layer 13 for each liquid crystal domain are made different from each other. For example, in the photosensitive organic film formed on the first substrate 11, polarized light is emitted to a region corresponding to the first domain 31 in the first scan and the fourth scan. In this case, the tilt direction of liquid crystal molecules imparted to the photosensitive organic film of the first domain 31 according to each scan is made different between the first scan and the second scan. In FIG. 3, the target tilt direction in the first scan and the target tilt direction in the second scan differ by an integer multiple of 90°, and in the first scan (first exposure), exposure is performed so that the tilt direction is 45°, and in the subsequent second scan (second exposure), exposure is performed so that the tilt direction is 315°. Due to this double exposure, the tilt direction of liquid crystal molecules defined by the first domain 31 in the photo-alignment film (the first alignment film 22) formed on the first substrate 11 is changed to 0°, which is an intermediate direction.

In addition, in each exposure from the first scan to the fourth scan, among the liquid crystal domains to be exposed, the previous numbers of exposures are the same. Specifically, as shown in FIG. 3, in the first scan, the first domain 31 and the second domain 32 are exposure targets, and in the second scan, the third domain 33 and the fourth domain 34, which are both subjected to first exposure, are exposure targets. In the subsequent third scan, the second domain 32 and the third domain 33, which are both subjected to second exposure, are exposure targets, and in the fourth scan, the first domain 31 and the fourth domain 34, which are both subjected to second exposure, are exposure targets. Therefore, exposure conditions (for example, exposure amounts) can be made different between the first exposure and the second exposure, and it is possible to obtain a photo-alignment film in which a desired tilt direction is imparted to the photosensitive organic film with as few scanning processes as possible.

In this manner, according to a configuration in which the number of exposures for each of the four liquid crystal domains included in the half pixel 30a is made the same (two times each, in the present embodiment), and a combination of alignment imparting and a slit electrode is the same among the liquid crystal domains, the occurrence of variations in characteristics among the liquid crystal domains can be minimized. Thereby, while dark lines can be made finer and thinner, it is possible to mitigate flicker due to a DC offset and minimize a variation in response speed of the liquid crystal.

Particularly, in the first embodiment, since an alignment division process according to a photo-alignment method is performed on both the side of the first substrate 11 and the side of the second substrate 12, it is possible to obtain a liquid crystal display device having a fast response speed of liquid crystal molecules and excellent low after-image characteristics.

In addition, in the liquid crystal display device of the first embodiment, since the direction in which the slit 15a of the pixel electrode 15 extends is parallel to the alignment direction of liquid crystal molecules in the liquid crystal layer 13, finger pushing resistance is also excellent.

<Method for Manufacturing Liquid Crystal Display Device>

Next, a method for manufacturing the liquid crystal display device 10 will be described. The liquid crystal display device 10 can be manufactured by a method including the following process 1 to process 3.

(Process 1: Film Formation Process)

First, the first substrate 11 and the second substrate 12 are prepared. Subsequently, a liquid crystal alignment agent is applied to each electrode arrangement surface of the first substrate 11 and the second substrate 12 and a coating film is formed on the substrate. In the process 1, a photosensitive organic film is formed on at least one of the first substrate 11 and the second substrate 12. In the present embodiment, a photosensitive organic film is formed on both the first substrate 11 and the second substrate 12. Preferably, the liquid crystal alignment agent is applied to the substrate by an offset printing method, a flexo printing method, a spin coating method, a roll coater method or an inkjet printing method.

After the liquid crystal alignment agent is applied, preheating (pre-baking) is preferably performed in order to prevent the applied liquid crystal alignment agent from dripping. The pre-bake temperature is preferably 30 to 200° C., and the pre-bake time is preferably 0.25 to 10 minutes. Then, firing (post baking) is performed in order to remove the solvent. The firing temperature (post bake temperature) is preferably 80 to 300° C., and the post bake time is preferably 5 to 200 minutes. The film thickness of the coating film formed is, for example, 0.001 to 1 μm.

(Process 2: Photo-Alignment Treatment Process)

Subsequently, a photo-alignment treatment is performed on at least one of the coating film formed in the process 1, and desired pretilt angle characteristics are imparted to the coating film. In the first embodiment, polarized radioactive light (linearly polarized light) is emitted to the photosensitive organic film formed on each surface of the first substrate 11 and the second substrate 12 using a photo mask in a direction oblique to the surface of the substrate. As the radioactive light to be emitted to the coating film, for example, ultraviolet light and visible light including light with a wavelength of 150 to 800 nm can be used. Ultraviolet light containing light with a wavelength of 200 to 400 nm is preferable.

Examples of light sources used include a low-pressure mercury lamp, a high-pressure mercury lamp, a deuterium lamp, a metal halide lamp, an argon resonance lamp, a xenon lamp, and an excimer laser. The amount of radioactive light emitted is preferably 400 to 50,000 J/m², and more preferably 1,000 to 20,000 J/m². After light emission, a treatment of washing the surface of the substrate with, for example, water, an organic solvent (for example, methanol, isopropyl alcohol, 1-methoxy-2-propanol acetate, butyl cellosolve, ethyl lactate, etc.) or a mixture thereof or a treatment of heating the substrate may be performed.

The photo-alignment treatment is performed by a process in which a plurality of exposures are performed on the surface to be exposed in different emission directions (scanning process). The scanning process is generally performed by scan exposure in which radioactive light is emitted to the photosensitive organic film while moving the substrate with respect to the light source or moving the light source with respect to the substrate. In the scanning process, when a plurality of exposures are performed on the coating film formed in the process 1, a photo-alignment film whose alignment is divided is obtained so that a plurality of liquid crystal domains in which directions in which a long axis direction of liquid crystal molecules present near the center of the liquid crystal layer 13 in the thickness direction is projected onto the first substrate 11 are different from each other are formed.

Figure 4:
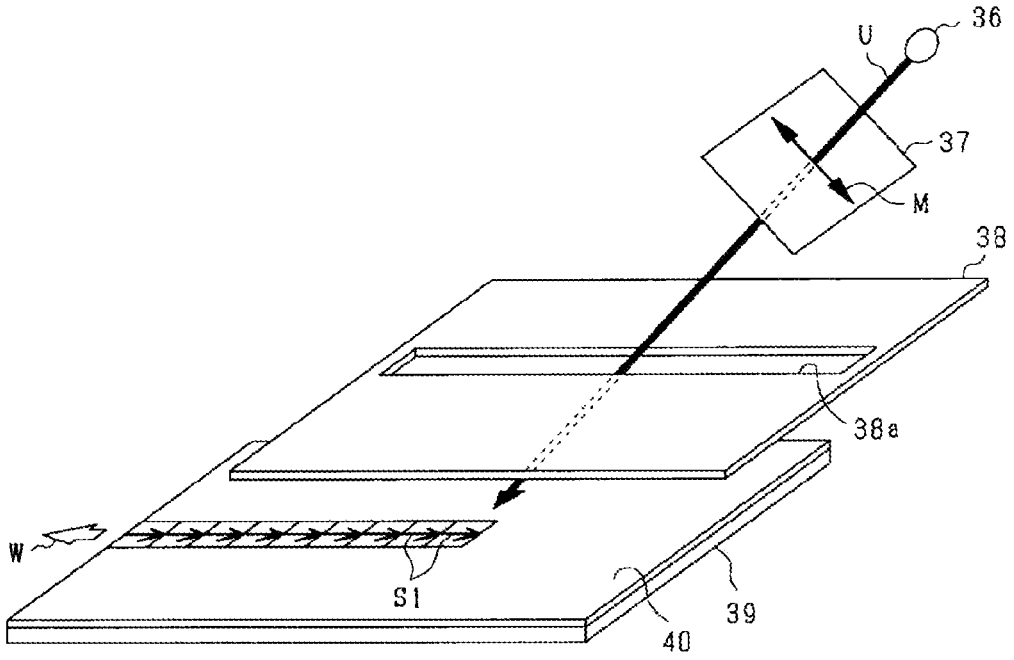
FIG. 4 is a diagram showing a schematic configuration of an exposure device and an exposure process.

An example of an exposure device used in the present embodiment and a scanning process will be described with reference to FIG. 4. In FIG. 4, the arrow of the reference numeral W indicates a direction in which a substrate 39 moves with respect to a light source 36, and the arrow of the reference numeral M indicates a transmission axis direction of a polarizer 37.

Light U emitted from the light source 36 is transmitted through the polarizer 37, and the transmitted light vibrating in the transmission axis direction passes through a slit 38a of a photo mask 38, and is emitted to an organic film 40 formed on the substrate of the substrate 39. Here, the substrate 39 may be either the first substrate 11 or the second substrate 12. In the present embodiment, linearly polarized light is emitted to the organic film formed on each of the first substrate 11 and the second substrate 12 according to a scanning process. Thereby, the same tilt direction (S1 in FIG. 4) is imparted to the organic film 40 in the movement direction of the substrate 39 with respect to the light source 36.

In the process 2, exposure is performed such that the number of exposures for each of the plurality of liquid crystal domains formed by alignment division is plural and the same among the domains. In addition, in each exposure in the alignment division process, exposure is performed on two or more liquid crystal domains in the arrangement direction (the pixel horizontal direction or the pixel vertical direction) of the liquid crystal domain, and the previous numbers of exposures in the liquid crystal domain to be exposed in each exposure is the same among the regions. Thereby, it is possible to obtain a photo-alignment film with as few scanning processes as possible, and variations in characteristics among the liquid crystal domains can be minimized.

(Process 3: Cell Construction Process)

Subsequently, a liquid crystal cell is manufactured by using two substrates (the first substrate 11 and the second substrate 12) on which a liquid crystal alignment film is formed, and by arranging a liquid crystal between the two substrates that are arranged to face each other. In order to manufacture a liquid crystal cell, for example, a method in which two substrates are arranged to face each other with a gap so that the liquid crystal alignment films face each other, peripheral parts of the two substrates are bonded to each other via the sealing member 25, a liquid crystal is injected and filled into the cell gap surrounded by the surface of the substrate and the sealing member 25, and an injection hole is sealed, or a method according to an ODF scheme may be used.

Subsequently, a pair of polarizing plates (polarizing plates 27 and 28) are bonded to the outer surface of the liquid crystal cell. Accordingly, the liquid crystal display device 10 is obtained. Examples of the polarizing plates 27 and 28 include a polarizing plate in which a polarized light film called "H film" in which iodine is absorbed while a polyvinyl alcohol is stretch-aligned is interposed between cellulose acetate protective films and a polarizing plate composed of the H film itself.

The liquid crystal display device 10 can be effectively applied to various applications. The liquid crystal display device 10 can be used as various display devices, for example, for clocks, handheld game consoles, word processors, laptop computers, car navigation systems, camcorders, PDAs, digital cameras, mobile phones, smartphones, various monitors, liquid crystal televisions, and information displays.

Second Embodiment

Next, a second embodiment will be described focusing on differences from the first embodiment. The present embodiment differs from the first embodiment in that, in the liquid crystal display device 10 shown in FIG. 1, the pretilt angle defined by the second alignment film 23 between the first alignment film 22 and the second alignment film 23 is less than 90 degrees, and the pretilt angle defined by the first alignment film 22 is substantially 90 degrees.

Figure 5:
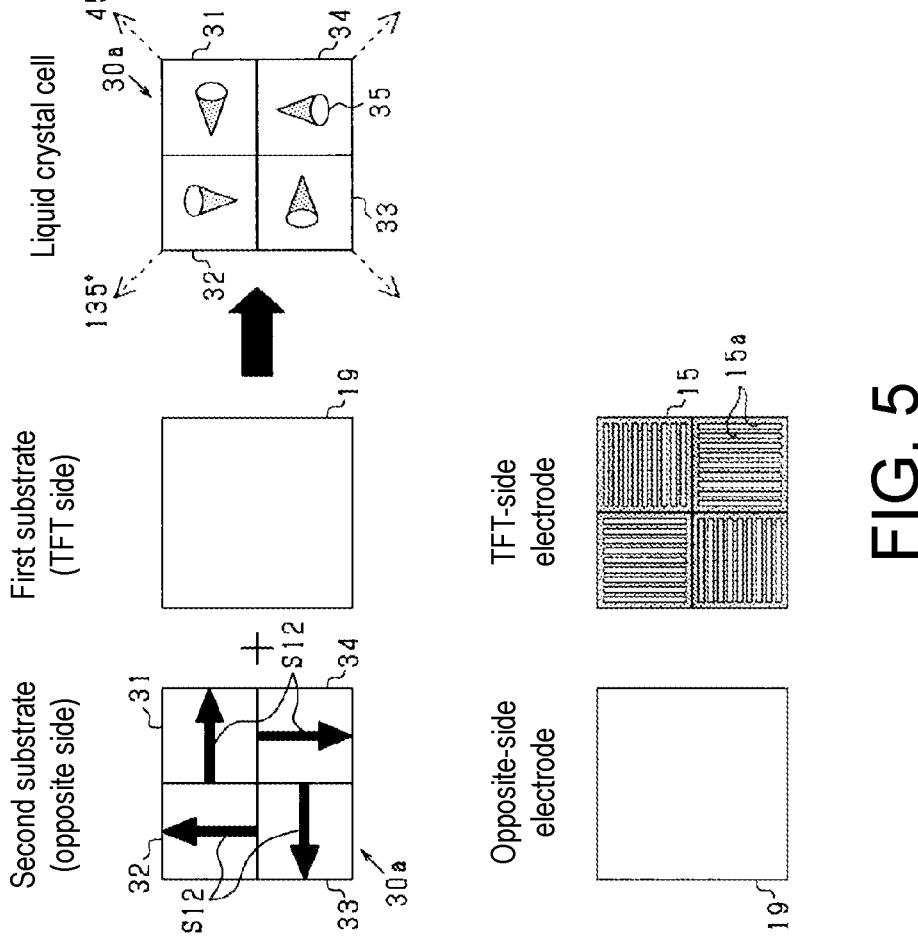
FIG. 5 is a schematic view showing a tilt direction and an alignment direction in a half pixel included in a liquid crystal display device of a second embodiment.

FIG. 5 shows four liquid crystal domains constituting the half pixel 30a included in the liquid crystal display device 10 of the second embodiment and an electrode structure. In the liquid crystal display device 10 of the second embodiment, the second alignment film 23 is a photo-alignment film, and the tilt direction of liquid crystal molecules near the second alignment film 23 is defined by the second alignment film 23. The tilt direction of liquid crystal molecules near the second alignment film 23 is 0° in the first domain 31, 90° in the second domain 32, 180° in the third domain 33, and 270° in the fourth domain 34 (refer to FIG. 5). On the other hand, exposure for imparting a pretilt angle is not performed on the organic film formed on the first substrate 11 using a liquid crystal alignment agent. Thereby, the pretilt angle on the side of the first substrate 11 is substantially 90°, and the pretilt angle on the side of the second substrate 12 is an angle smaller than 90°. The electrode structure is the same as that of the first embodiment.

Here, when the pretilt angle defined by the liquid crystal alignment film is substantially 90 degrees, instead of a configuration in which no exposure is performed on the organic film formed on the substrate, non-polarized light exposure may be performed on the entire organic film in the substrate normal direction without using a photo mask. In this case, the organic film with a pretilt angle of substantially 90 degrees may be exposed to parallel light or diffused light. The first alignment film 22 may be the same liquid crystal alignment agent used for forming the second alignment film 23 or may be different liquid crystal alignment agent (for example, a polymer composition containing no photosensitive polymer). In this specification "substantially 90 degrees" indicates a range of 90 degrees±0.2 degrees. The pretilt angle defined by the first alignment film 22 is preferably 90 degrees±0.1 degrees.

In such a half pixel 30a included in the liquid crystal display device 10 of the second embodiment, the alignment direction of liquid crystal molecules in the liquid crystal layer 13 is, as shown in "liquid crystal cell" in FIG. 5, 0° in the first domain 31, 90° in the second domain 32, 180° in the third domain 33, and 270° in the fourth domain 34. One of the polarizing axis of the first polarizing plate 27 and the polarizing axis of the second polarizing plate 28 extends in the 45° direction, and the other extends in the 135° direction.

Figure 6:
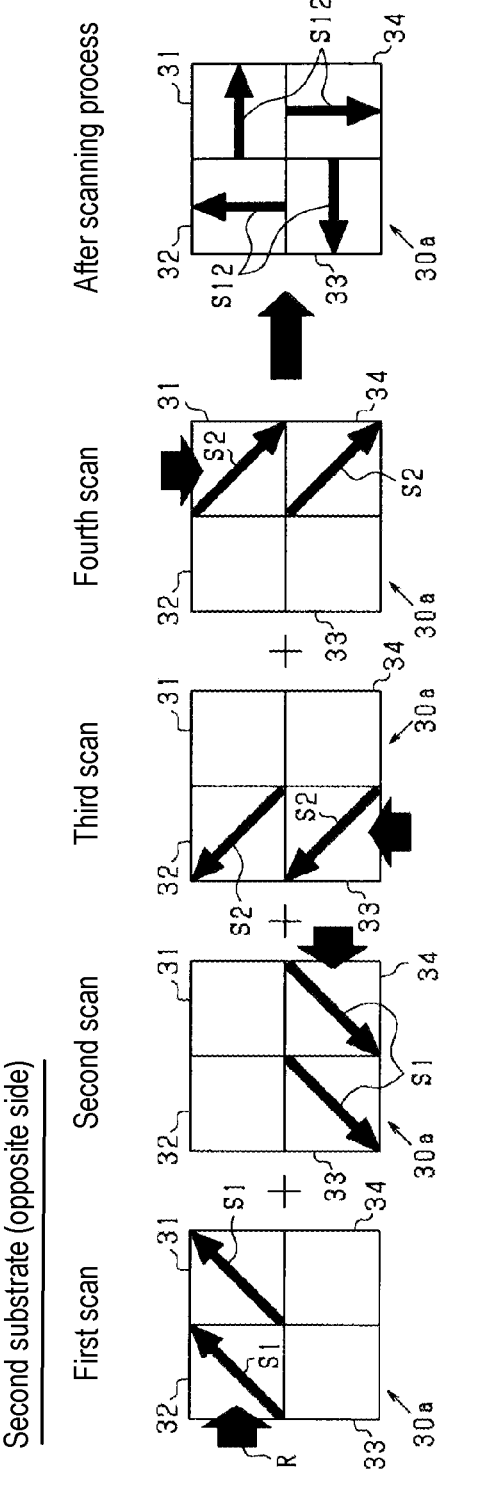
FIG. 6 is a schematic view showing an exposure process in a half pixel included in the liquid crystal display device of the second embodiment.

FIG. 6 shows an outline of the exposure process of the photo-alignment treatment for alignment division. As shown in FIG. 6, in the second embodiment, when the photosensitive organic film formed on the second substrate 12 is subjected to a total of four scan exposures, in the liquid crystal domains of the second substrate 12, the tilt directions of liquid crystal molecules is 0°, 90°, 180°, and 270° (refer to "after scanning process" in FIG. 6).

In the photo-alignment treatment for obtaining the second alignment film 23, as shown in FIG. 6, in the photosensitive organic film formed on the second substrate 12, the regions corresponding to the domains 31 to 34 are exposed twice in the first exposure and the second exposure. For example, linearly polarized light is emitted to the first domain 31 of the photosensitive organic film formed on the second substrate 12 according to the first scan (first exposure) and the fourth scan (second exposure). In addition, in the first scan, the first domain 31 and the second domain 32 arranged adjacent to each other in the pixel horizontal direction are exposure targets, and in the second scan, the third domain 33 and the fourth domain 34, which are arranged adjacent to each other in the pixel horizontal direction and are both subjected to first exposure, are exposure targets. In the subsequent third scan, the second domain 32 and the third domain 33, which are arranged adjacent to each other in the pixel vertical direction and are both subjected to second exposure, are exposure targets, and in the fourth scan, the first domain 31 and the fourth domain 34 which are arranged adjacent to each other in the pixel vertical direction and are both subjected to the second exposure, are exposure targets.

In this manner, when the number of exposures for each of the four liquid crystal domains within the half pixel 30a is plural and the same (two times each, in the present embodiment), and in each exposure, exposure is performed so that the previous numbers of exposures are the same among the liquid crystal domains to be exposed, and additionally, the same combination of alignment imparting and a slit electrode is used, it is possible to mitigate flicker due to a DC offset and minimize a variation in response speed of liquid crystal molecules while dark lines can be made finer and thinner. In addition, finger pushing resistance is also excellent.

Particularly, in the second embodiment, since scan exposure for alignment division is performed on the side of the second substrate 12, and scan exposure is not performed on the side of the first substrate 11, the number of processes can be reduced during panel manufacturing, and throughput in production is excellent.

In addition, in the liquid crystal display device of the second embodiment, since the pretilt angle defined by the liquid crystal alignment film of the substrate (that is, the counter substrate 12) opposite to the substrate in which a slit electrode is provided (the pixel electrode 15) is less than 90 degrees, even if only one of the pair of substrates is subjected to alignment division, a response speed of liquid crystal molecules is fast, and excellent low after-image characteristics can be exhibited.

Third Embodiment

Next, a third embodiment will be described focusing on differences from the first embodiment. The present embodiment differs from the first embodiment in that, in the liquid crystal display device 10 shown in FIG. 1, the pretilt angle defined by the first alignment film 22 between the first alignment film 22 and the second alignment film 23 is less than 90 degrees, the pretilt angle defined by the second alignment film 23 is substantially 90 degrees, and the electrode structure.

Figure 7:
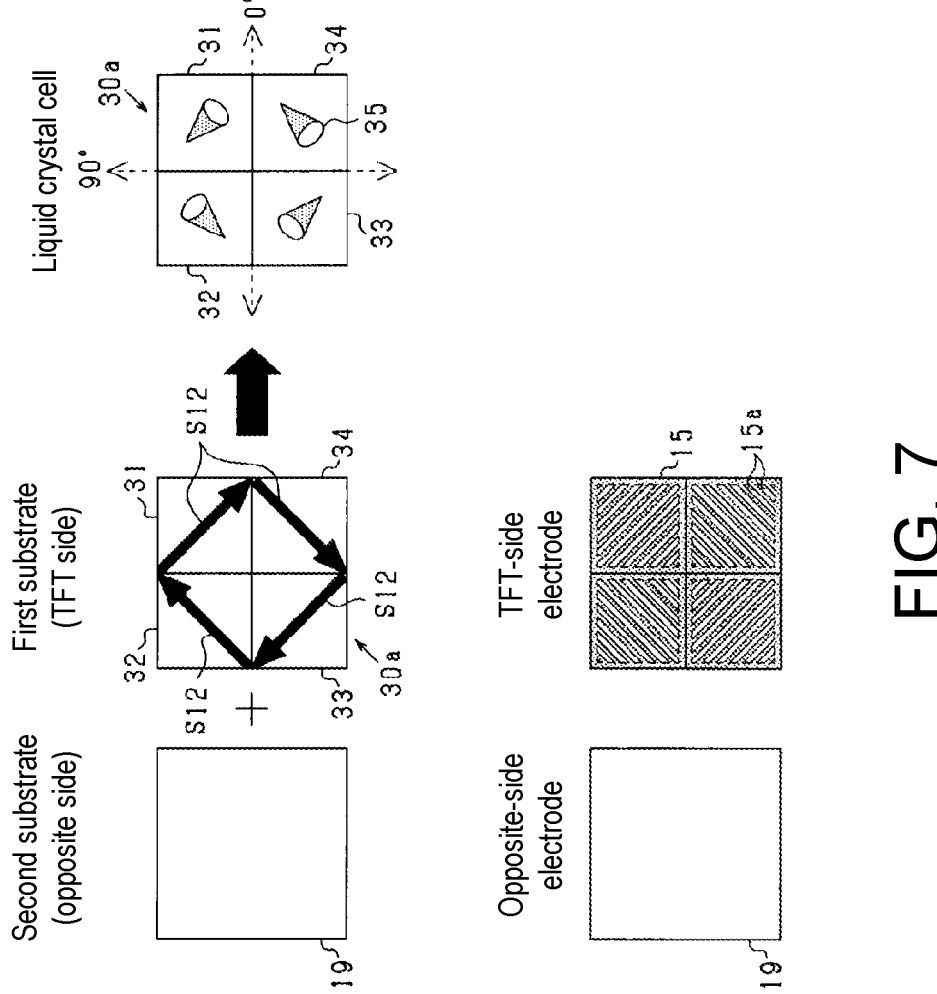
FIG. 7 is a schematic view showing a tilt direction and an alignment direction in a half pixel included in a liquid crystal display device of a third embodiment.

FIG. 7 shows four liquid crystal domains constituting the half pixel 30a included in the liquid crystal display device 10 of the third embodiment and an electrode structure. In the liquid crystal display device 10 of the third embodiment, the first alignment film 22 is a photo-alignment film, and the tilt direction of liquid crystal molecules near the first alignment film 22 is defined by the first alignment film 22. The tilt direction of liquid crystal molecules near the first alignment film 22 is 315° in the first domain 31, 45° in the second domain 32, 135° in the third domain 33, and 225° in the fourth domain 34 (refer to FIG. 7). On the other hand, exposure for imparting a pretilt angle is not performed on the organic film formed on the second substrate 12 using a liquid crystal alignment agent or non-polarized light exposure is performed on the entire film in the substrate normal direction without using a photo mask. Thereby, the pretilt angle on the side of the first substrate 11 is an angle smaller than 90°, and the pretilt angle on the side of the second substrate 12 is substantially 90°.

The pixel electrode 15 provided on the side of the first substrate 11 is a slit electrode, and a plurality of slits 15a extending obliquely parallel to the alignment direction (tilt direction) of liquid crystal molecules near the first alignment film 22 are formed. More specifically, as shown in FIG. 7, in the first domain 31 and the third domain 33, a slit extending in the 135° direction is formed, and in the second domain 32 and the fourth domain 34, a slit extending in the 45° direction is formed. On the other hand, the counter electrode 19 provided on the side of the second substrate 12 is a planar electrode (solid electrode).

In such a half pixel 30a included in the liquid crystal display device 10 of the third embodiment, the alignment direction of liquid crystal molecules in the liquid crystal layer 13 is, as shown in "liquid crystal cell" in FIG. 7, 315° in the first domain 31, 45° in the second domain 32, 135° in the third domain 33, and 225° in the fourth domain 34. The polarizing axis of the first polarizing plate 27 and the polarizing axis of the second polarizing plate 28 are perpendicular to each other, and one axis extends in the 0° direction, and the other axis extends in the 90° direction. Therefore, in the liquid crystal domains of the first domain 31 to the fourth domain 34, an angle formed by the alignment direction of liquid crystal molecules in the liquid crystal layer 13 (315°, 45°, 135°, 225°) and the direction in which the polarizing axes of the pair of polarizing plates 27 and 28 extend is 45°.

Figure 8:
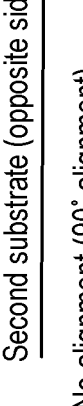
FIG. 8 is a schematic view showing an exposure process in a half pixel included in the liquid crystal display device of the third embodiment.
Figure 8:
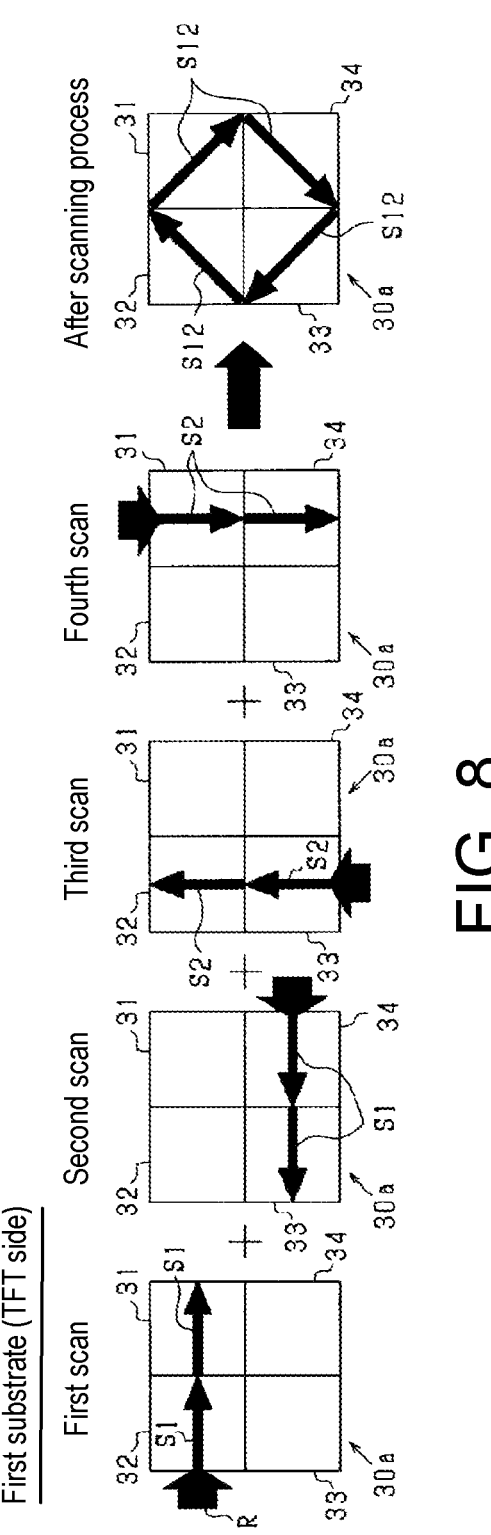

FIG. 8 shows an outline of the scan exposure treatment when a photo-alignment film whose alignment is divided is formed. As shown in FIG. 8, in the third embodiment, when the first substrate 11 is subjected to a total of four scan exposures, the tilt directions of liquid crystal molecules in the liquid crystal domains of the first substrate 11 are 315°, 45°, 135°, and 225° (refer to "after scanning process" in FIG. 8).

As shown in FIG. 8, in the third embodiment, for the photosensitive organic film formed on the first substrate 11, the regions corresponding to the domains 31 to 34 are exposed twice in the first exposure and the second exposure. For example, linearly polarized light is emitted to the first domain 31 of the organic film formed on the first substrate 11 using a liquid crystal alignment agent in the first scan and the fourth scan. In addition, in the first scan, the first domain 31 and the second domain 32 arranged adjacent to each other in the pixel horizontal direction are exposure targets, and in the second scan, the third domain 33 and the fourth domain 34, which are arranged adjacent to each other in the pixel horizontal direction and are both subjected to first exposure, are exposure targets. In the subsequent third scan, the second domain 32 and the third domain 33, which are arranged adjacent to each other in the pixel vertical direction and are both subjected to second exposure, are exposure targets, and in the fourth scan, the first domain 31 and the fourth domain 34 which are arranged adjacent to each other in the pixel vertical direction and are both subjected to the second exposure, are exposure targets.

In this manner, when the number of exposures for each of the plurality of liquid crystal domains within the half pixel 30*a* is plural and the same, and in each exposure, exposure is performed so that the previous numbers of exposures are the same among the liquid crystal domains to be exposed, and additionally the same combination of alignment imparting and a slit electrode is used, it is possible to mitigate flicker due to a DC offset and minimize a variation in response speed of liquid crystal molecules while dark lines can be made finer and thinner.

Particularly, in the third embodiment, since the alignment division process according to the photo-alignment method is performed on the side of the first substrate 11 and the alignment division process is not performed on the side of the second substrate 12, the number of processes can be reduced during panel manufacturing, and throughput in production is excellent.

Fourth Embodiment

Next, a fourth embodiment will be described focusing on differences from the first embodiment. The present embodiment differs from the first embodiment in that, in the liquid crystal display device 10 in FIG. 1, the pretilt angle defined by the second alignment film 23 between the first alignment film 22 and the second alignment film 23 is less than 90 degrees, the pretilt angle defined by the first alignment film 22 is substantially 90 degrees, and the slit 15*a* of the pixel electrode 15 extends in the oblique direction.

Figure 9:
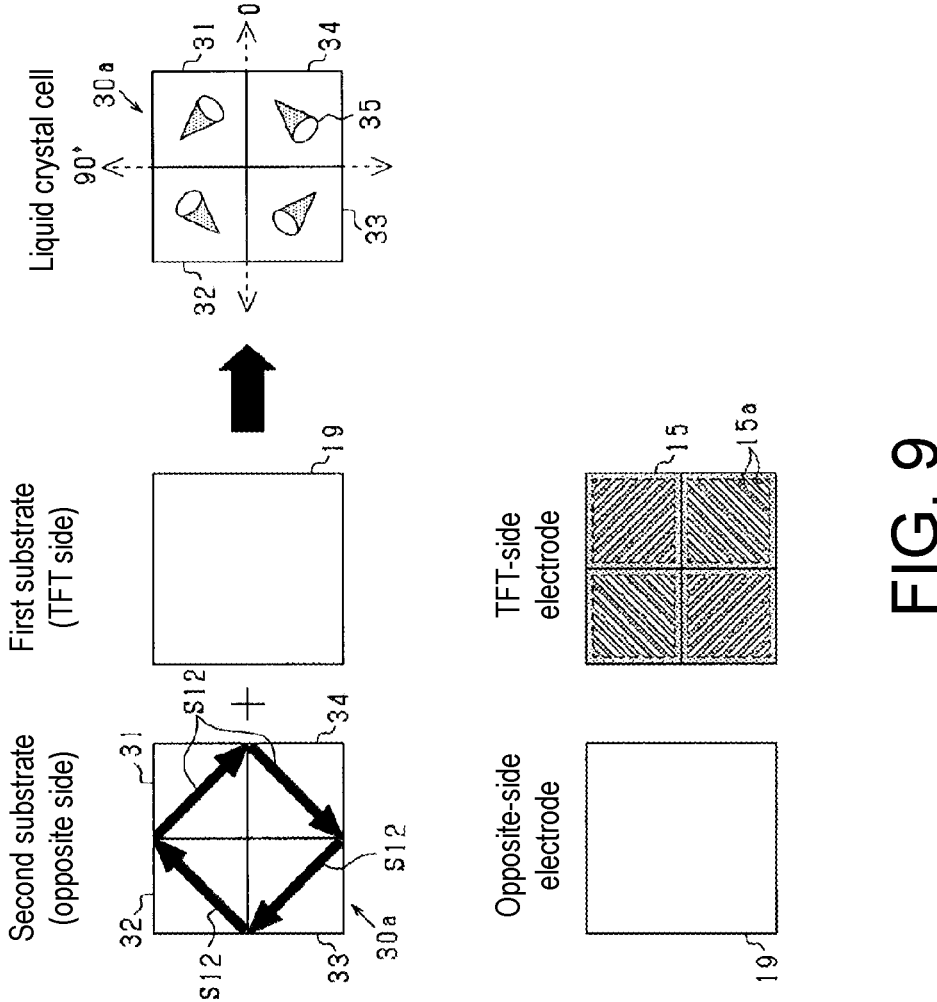
FIG. 9 is a schematic view showing a tilt direction and an alignment direction in a half pixel included in a liquid crystal display device of a fourth embodiment.

FIG. 9 shows four liquid crystal domains constituting the half pixel 30*a* included in the liquid crystal display device 10 of the fourth embodiment and an electrode structure. In the liquid crystal display device 10 of the fourth embodiment, the second alignment film 23 is a photo-alignment film, and the tilt direction of liquid crystal molecules near the second alignment film 23 is defined by the second alignment film 23. The tilt direction of liquid crystal molecules near the second alignment film 23 is 315° in the first domain 31, 45° in the second domain 32, 135° in the third domain 33, and 225° in the fourth domain 34 (refer to FIG. 9). On the other hand, exposure for imparting a pretilt angle is not performed on the organic film formed on the first substrate 11 using a liquid crystal alignment agent or non-polarized light exposure is performed on the entire film in the substrate normal direction without using a photo mask. Thereby, the pretilt angle on the side of the first substrate 11 is substantially 90° and the pretilt angle on the side of the second substrate 12 is an angle smaller than 90°. The electrode structure is the same as that of the third embodiment.

In such a half pixel 30*a* included in the liquid crystal display device 10 of the fourth embodiment, the alignment direction of liquid crystal molecules in the liquid crystal layer 13 is, as shown in FIG. 9 (liquid crystal cell), 315° in the first domain 31, 45° in the second domain 32, 135° in the third domain 33, and 225° in the fourth domain 34. The polarizing axis of the first polarizing plate 27 and the polarizing axis of the second polarizing plate 28 are perpendicular to each other, and one axis extends in the 0° direction and the other axis extends in the 90° direction.

Figure 10:
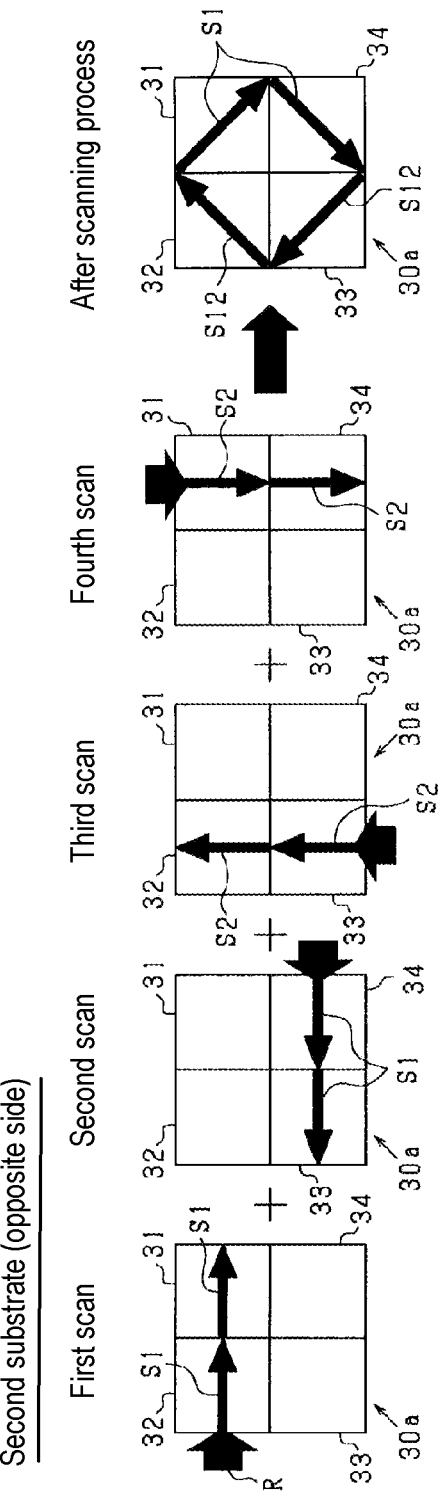
FIG. 10 is a schematic view showing an exposure process in a half pixel included in the liquid crystal display device of the fourth embodiment.

FIG. 10 shows an outline of the exposure process of the photo-alignment treatment. As shown in FIG. 10, in the fourth embodiment, the second substrate 12 is subjected to a total of four scan exposures. In this case, in the fourth embodiment, for the photosensitive organic film formed on the second substrate 12, the regions corresponding to the domains 31 to 34 are exposed twice in the first exposure and the second exposure. For example, light is emitted to the first domain 31 of the organic film formed on the second substrate 12 using a liquid crystal alignment agent in the first scan and the fourth scan. In addition, in each exposure from the first scan to the fourth scan, the previous numbers of exposures are the same among the liquid crystal domains to be exposed, that is, exposure is performed so that whether the liquid crystal domain to be exposed is subjected to first exposure or second exposure is the same among the domains. In this manner, when the number of exposures for each of the plurality of liquid crystal domains within the half pixel 30*a* is plural and the same, and in each exposure, exposure is performed so that the previous numbers of exposures are the same among the liquid crystal domains to be exposed, and additionally the same combination of alignment imparting and a slit electrode is used, it is possible to mitigate flicker due to a DC offset and minimize a variation in response speed of liquid crystal molecules while dark lines can be made finer and thinner.

In addition, since the alignment division process according to the photo-alignment method is performed on the side of the second substrate 12, and the alignment division process is not performed on the side of the first substrate 11, the number of processes can be reduced during panel manufacturing, and throughput in production is excellent.

In addition, in the liquid crystal display device of the fourth embodiment, the liquid crystal alignment film of the substrate opposite to the pixel electrode 15 having the slit 15*a* is a photo-alignment film whose alignment is divided, and the pretilt angle defined by photo-alignment film is less than 90 degrees. In such a configuration, even if an alignment division process is performed only one substrate, in the obtained liquid crystal display device, a response speed of liquid crystal molecules is fast, and excellent low after-image characteristics can be exhibited.

The liquid crystal display devices 10 of the following fifth embodiment to eighth embodiment are different from those of the above first to fourth embodiments in that the liquid crystal layer 13 contains a liquid crystal having negative dielectric anisotropy and also a chiral agent. The chiral agent is not particularly limited, and examples thereof include "S-811," "R-811," and "CB-15" (all names of products, commercially available from Merck). The amount of the chiral agent added is, for example, 0.1 to 10 mass %, based on a total amount of the liquid crystal having negative dielectric anisotropy. Hereinafter, the fifth embodiment to eighth embodiment will be described focusing on differences from the first embodiment.

Fifth Embodiment

Figure 11:
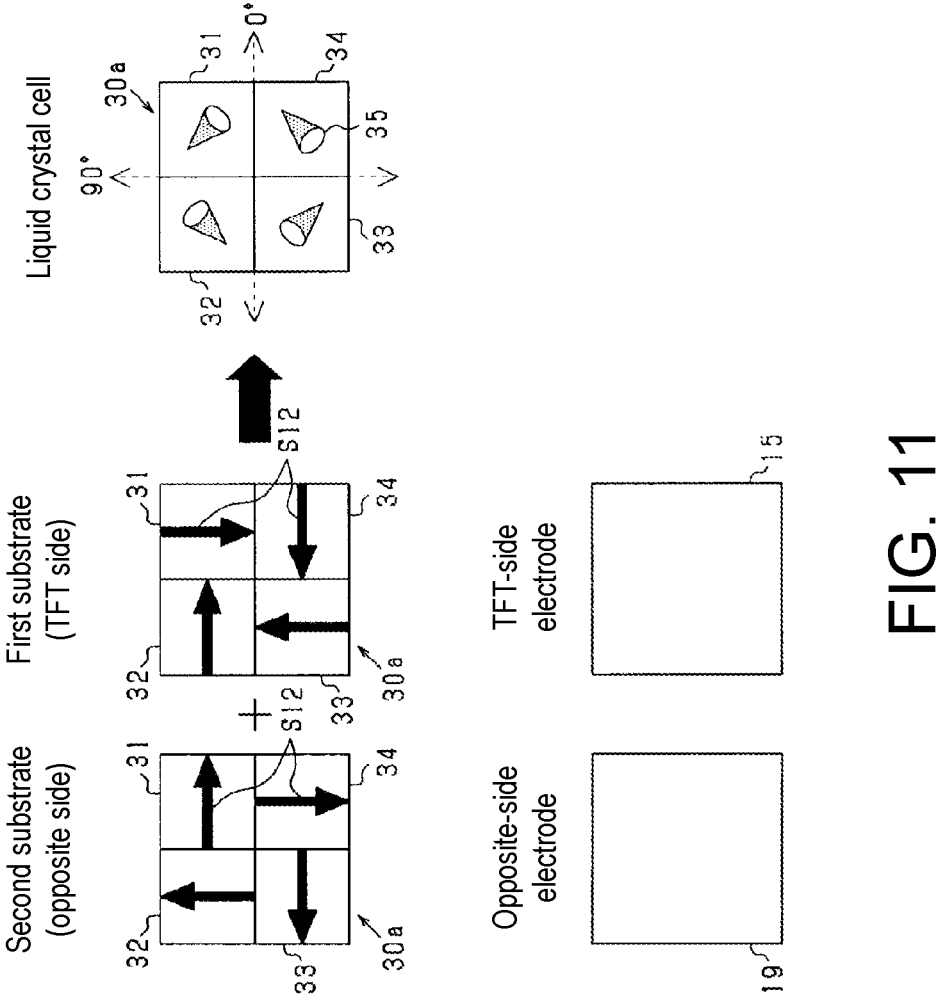
FIG. 11 is a schematic view showing a tilt direction and an alignment direction in a half pixel included in a liquid crystal display device of a fifth embodiment.

FIG. 11 shows four liquid crystal domains constituting the half pixel 30*a* included in the liquid crystal display device 10 of a fifth embodiment and an electrode structure. In the liquid crystal display device 10 shown in FIG. 1, in the fifth embodiment, the first alignment film 22 and the second alignment film 23 are both photo-alignment films subjected to the alignment division process. In the liquid crystal domains, the alignment directions (tilt directions) of liquid crystal molecules near the alignment film are defined by the first alignment film 22 and the second alignment film 23 to have different tilt directions among the liquid crystal domains.

The tilt direction of liquid crystal molecules in the fifth embodiment differs by 90° between the side of the first substrate 11 and the side of the second substrate 12 in the domains 31 to 34. Specifically, on the side of the first substrate 11, the tilt direction is 0° in the first domain 31, 90° in the second domain 32, 180° in the third domain 33, and 270° in the fourth domain 34. On the side of the second substrate 12, the tilt direction is 270° in the first domain 31, 0° in the second domain 32, 90° in the third domain 33, and 180° in the fourth domain 34 (refer to FIG. 11). The pixel electrode 15 provided on the side of the first substrate 11 and the counter electrode 19 provided on the side of the second substrate 12 are planar electrodes (solid electrodes) in which no slit is formed.

In such a half pixel 30a included in the liquid crystal display device 10 of the fifth embodiment, the alignment directions of liquid crystal molecules in the liquid crystal layer 13 are different among the liquid crystal domains. Specifically, as shown in "liquid crystal cell" in FIG. 11, the alignment direction is 315° in the first domain 31, 45° in the second domain 32, 135° in the third domain 33, and 225° in the fourth domain 34. The polarizing axis of the first polarizing plate 27 and the polarizing axis of the second polarizing plate 28 are perpendicular to each other, and one axis extends in the 0° direction and the other axis extends in the 90° direction.

Figure 12:
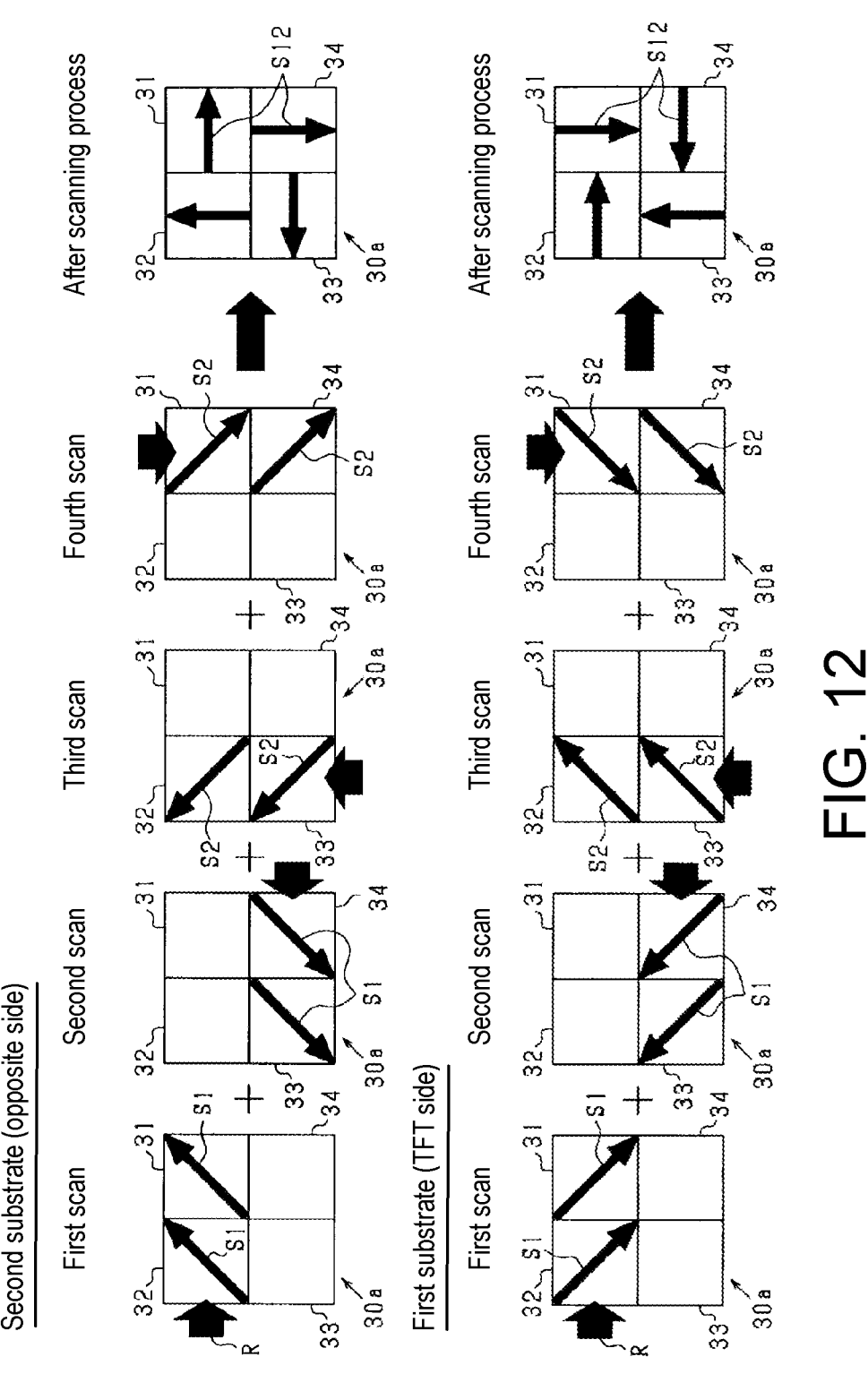
FIG. 12 is a schematic view showing an exposure process in a half pixel included in the liquid crystal display device of the fifth embodiment.

FIG. 12 shows an outline of the scan exposure treatment for the alignment division process. As shown in FIG. 12, in the fifth embodiment, the first substrate 11 and the second substrate 12 are each subjected to a total of four scan exposures. In this case, the photosensitive organic film formed in each of the domains 31 to 34 is exposed twice in the first exposure and the second exposure. For example, linearly polarized light is emitted to the first domain 31 of the organic film formed on the first substrate 11 using a liquid crystal alignment agent in the first scan and the fourth scan. In addition, in each exposure from the first scan to the fourth scan, exposure is performed so that the previous numbers of exposures are the same among the liquid crystal domains to be exposed.

In this manner, when the number of exposures for each of the plurality of liquid crystal domains within the half pixel 30a is plural and the same, and in each exposure, exposure is performed so that the previous numbers of exposures are the same among the liquid crystal domains to be exposed, and additionally the same combination of alignment imparting and a slit electrode is used, while dark lines can be made finer and thinner, it is possible to mitigate flicker due to a DC offset and minimize a variation in response speed of liquid crystal molecules.

Sixth Embodiment

Figure 13:
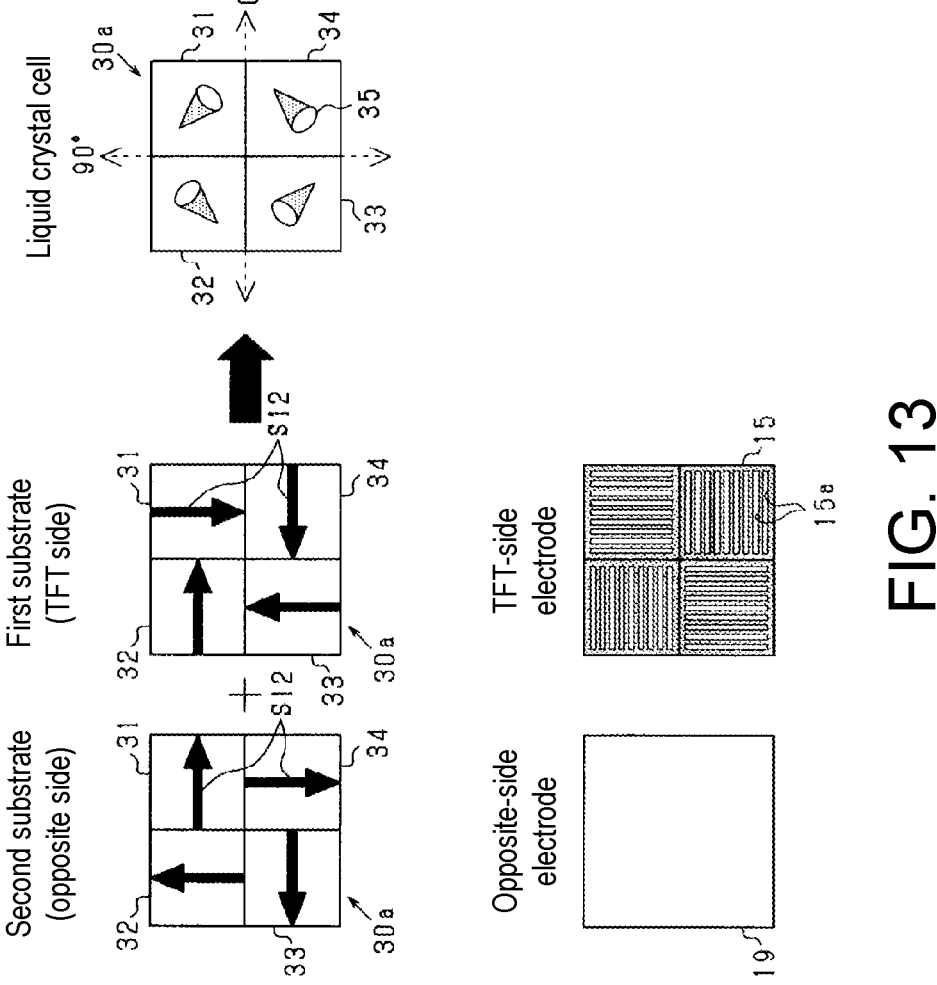
FIG. 13 is a schematic view showing a tilt direction and an alignment direction in a half pixel included in a liquid crystal display device of a sixth embodiment.
Figure 14:
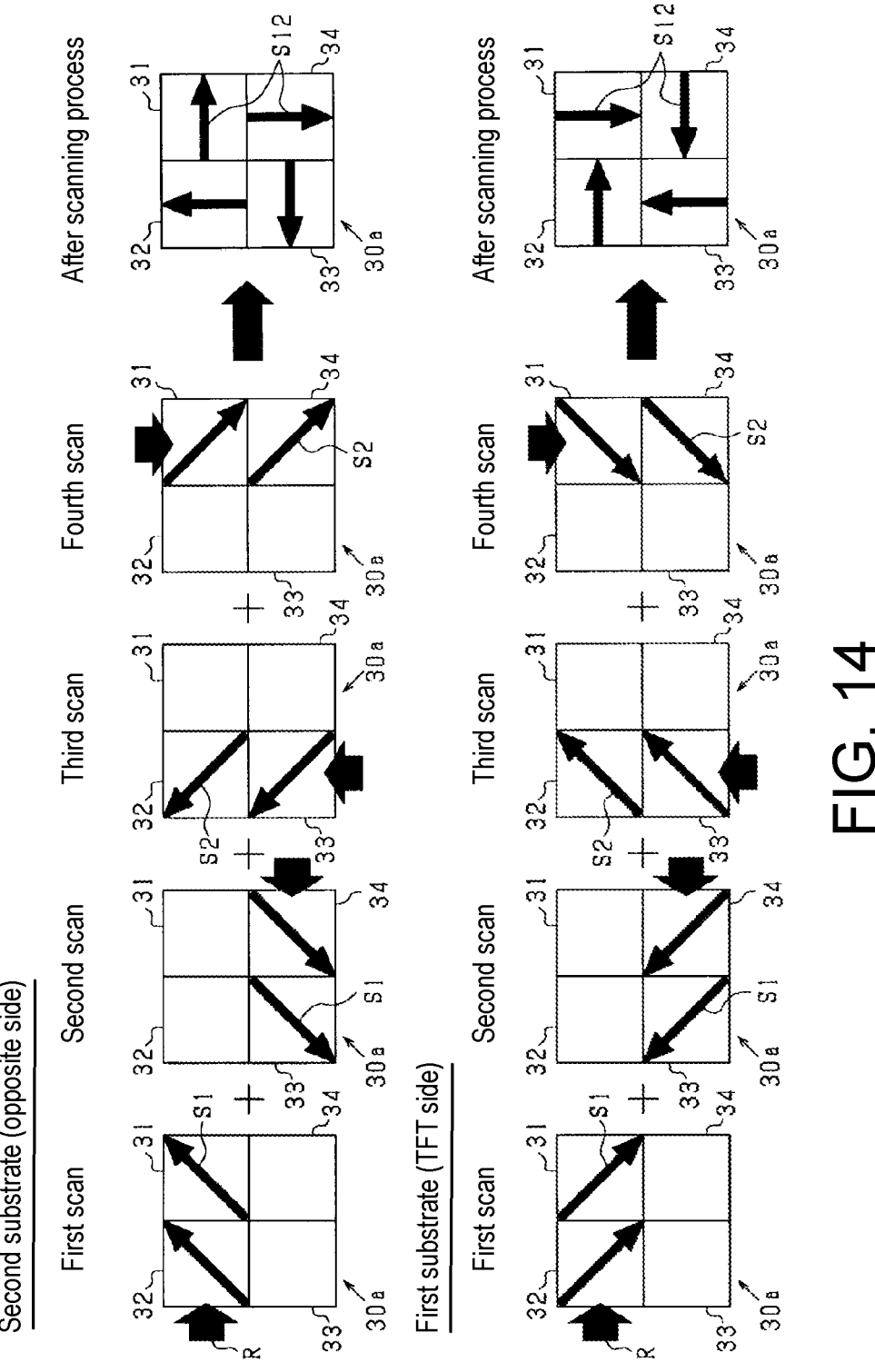
FIG. 14 is a schematic view showing an exposure process in a half pixel included in the liquid crystal display device of the sixth embodiment.

FIG. 13 is a schematic view showing four liquid crystal domains constituting the half pixel 30a included in the liquid crystal display device 10 of a sixth embodiment and an electrode structure. The liquid crystal display device 10 of the sixth embodiment has the same configuration as that of the fifth embodiment except that a slit electrode is used as the pixel electrode 15 instead of a planar electrode. Also in the liquid crystal display device 10 of the sixth embodiment, the number of exposures for each of the plurality of liquid crystal domains within the half pixel 30a is plural and the same, and in each exposure, exposure is performed so that the previous numbers of exposures are the same among the liquid crystal domains to be exposed, and additionally, the combination of alignment imparting and a slit electrode is the same (refer to FIG. 14). Thereby, while dark lines can be made finer and thinner, it is possible to mitigate flicker due to a DC offset and minimize a variation in response speed of liquid crystal molecules.

Seventh Embodiment

Next, a seventh embodiment will be described. The present embodiment differs from the first embodiment in that the four liquid crystal domains 31 to 34 within the half pixel 30a are arranged side by side in the vertical direction, the pixel electrode 15 is a planar electrode, and the liquid crystal layer 13 contains a chiral agent.

Figure 15:
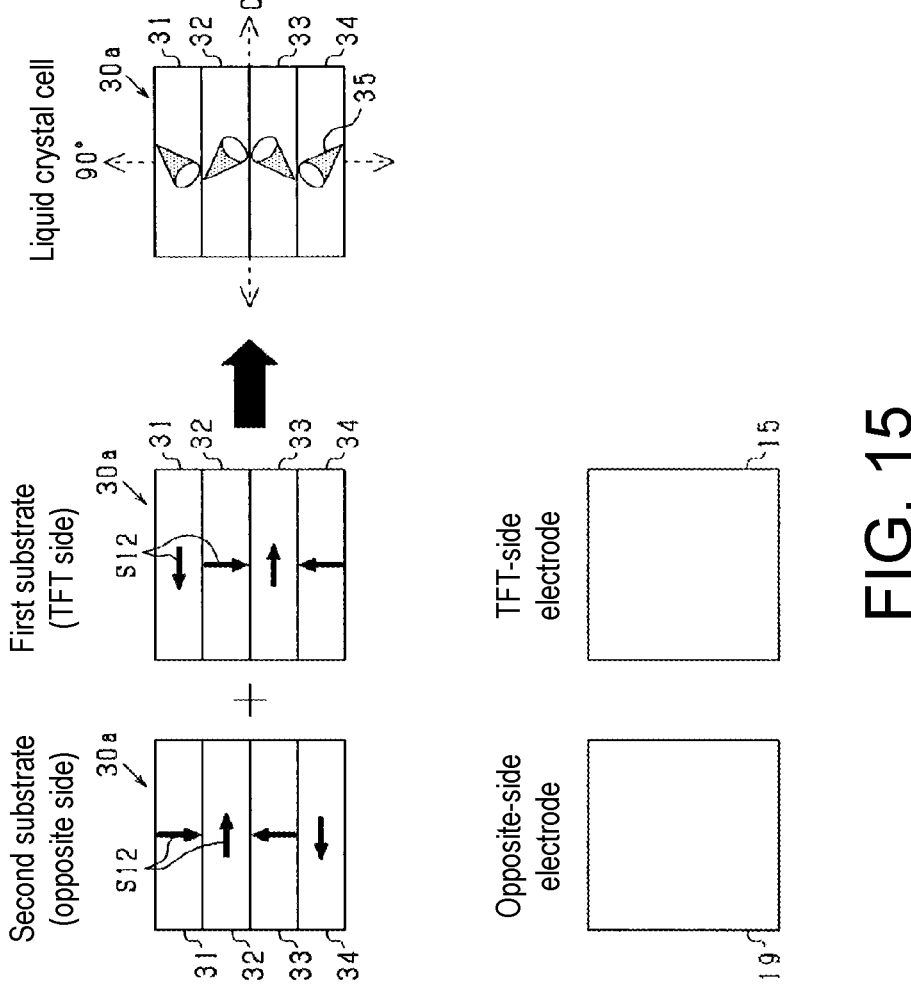
FIG. 15 is a schematic view showing a tilt direction and an alignment direction in a half pixel included in a liquid crystal display device of a seventh embodiment.

FIG. 15 is a schematic view showing four liquid crystal domains of the half pixel 30a constituting the liquid crystal display device 10 of the seventh embodiment and an electrode structure. In the liquid crystal display device 10 of the seventh embodiment, both the first alignment film 22 and the second alignment film 23 are a photo-alignment film whose alignment is divided. For liquid crystal molecules near the alignment film each of the first alignment film 22 and the second alignment film 23, different tilt directions are defined among the liquid crystal domains by each alignment film.

The tilt direction of liquid crystal molecules in the seventh embodiment differs by 90° between the side of the first substrate 11 and the side of the second substrate 12 in the domains 31 to 34. Specifically, on the side of the first substrate 11, the tilt direction is 180° in the first domain 31, 270° in the second domain 32, 0° in the third domain 33, and 90° in the fourth domain 34. On the side of the second substrate 12, the tilt direction is 270° in the first domain 31, 0° in the second domain 32, 90° in the third domain 33, and 180° in the fourth domain 34 (refer to FIG. 15). The pixel electrode 15 provided on the side of the first substrate 11 and the counter electrode 19 provided on the side of the second substrate 12 are planar electrodes (solid electrodes) in which no slit is formed.

In such a half pixel 30a included in the liquid crystal display device 10 of the seventh embodiment, the alignment direction of liquid crystal molecules in the liquid crystal layer 13 is, as shown in "liquid crystal cell" in FIG. 15, 225° in the first domain 31, 315° in the second domain 32, 45° in the third domain 33, and 135° in the fourth domain 34. The polarizing axis of the first polarizing plate 27 and the polarizing axis of the second polarizing plate 28 are perpendicular to each other, one axis extends in the 0° direction, and the other axis extends in the 90° direction.

Figure 16:
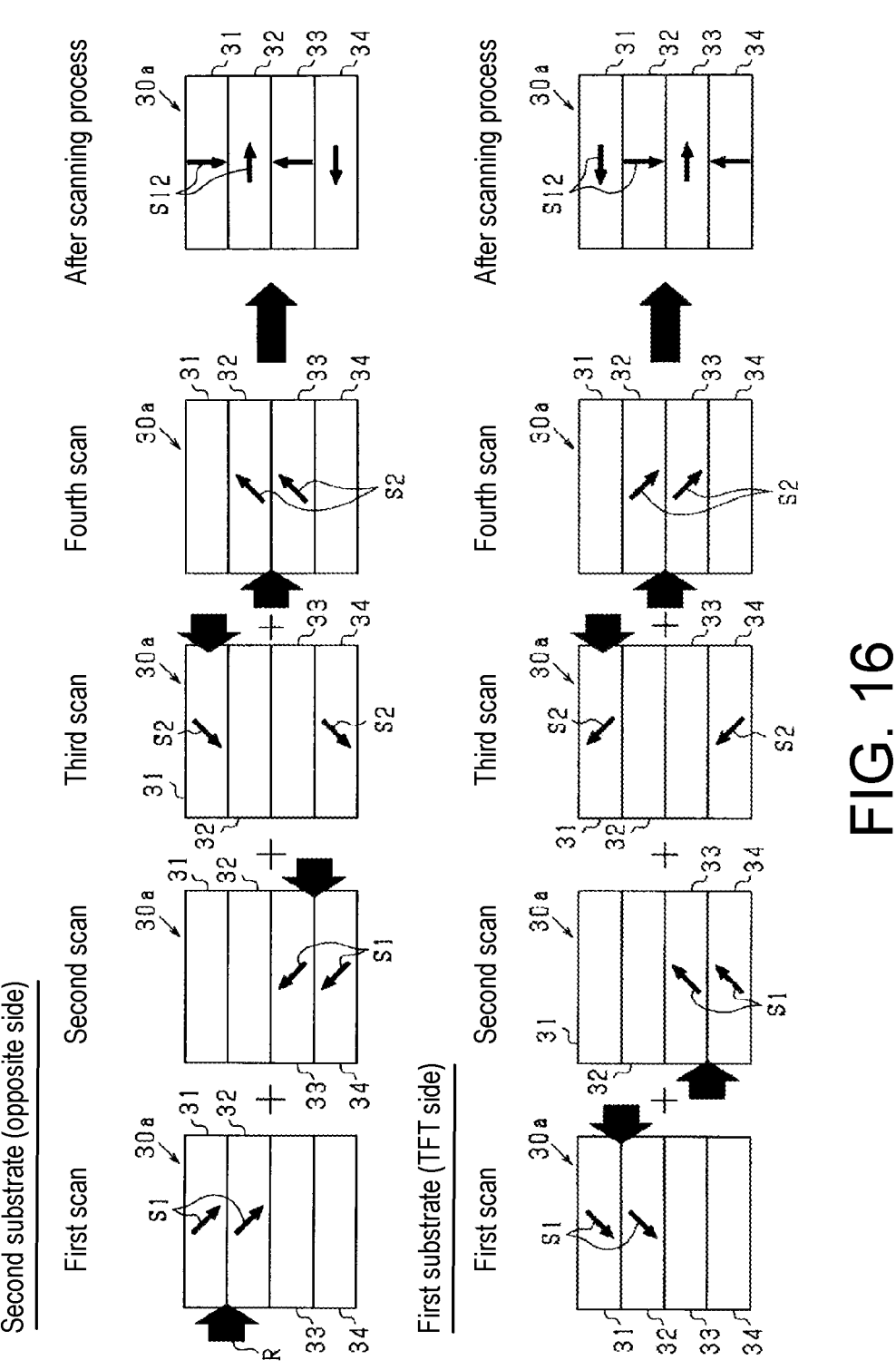
FIG. 16 is a schematic view showing an exposure process in a half pixel included in the liquid crystal display device of the seventh embodiment.

FIG. 16 shows an outline of the exposure process for the alignment division process according to a photo-alignment method. In the seventh embodiment, each of the first substrate 11 and the second substrate 12 is subjected to a total of four scan exposures. In this case, for the photosensitive organic film formed on each substrate, the regions corresponding to the domains 31 to 34 are exposed twice in the first exposure and the second exposure. For example, linearly polarized light is emitted to the first domain 31 of the photosensitive organic film formed on the first substrate 11 using a liquid crystal alignment agent in the first scan and the third scan. In addition, in each exposure from the first scan to the fourth scan, exposure is performed so that the previous numbers of exposures are the same among the liquid crystal domains to be exposed.

In this manner, when the number of exposures for each of the plurality of liquid crystal domains within the half pixel 30a is plural and the same, and in each exposure, exposure is performed so that the previous numbers of exposures are the same among the liquid crystal domains to be exposed, and additionally the same combination of alignment imparting and a slit electrode is used, it is possible to mitigate flicker due to a DC offset and minimize a variation in response speed of liquid crystal molecules while dark lines can be made finer and thinner.

Eighth Embodiment

Figure 17:
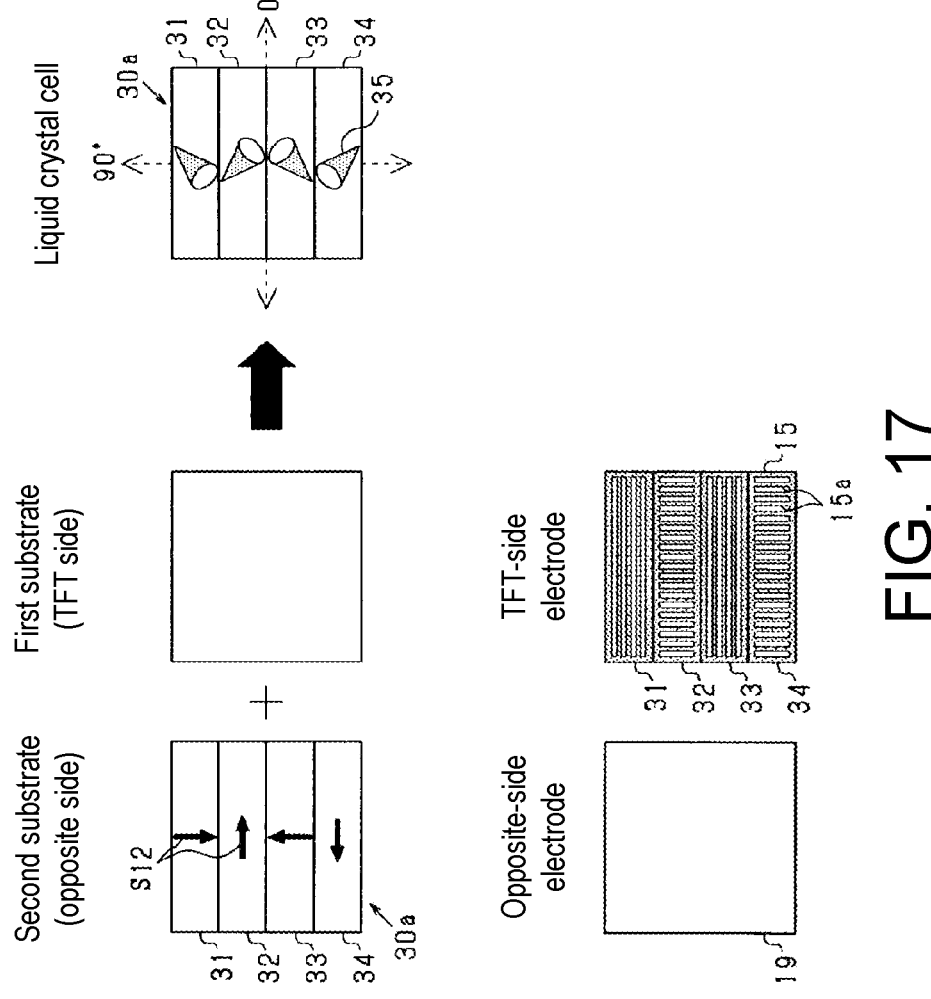
FIG. 17 is a schematic view showing a tilt direction and an alignment direction in a half pixel included in a liquid crystal display device of an eighth embodiment.

FIG. 17 is a schematic view showing four liquid crystal domains constituting the half pixel 30a included in the liquid crystal display device 10 of an eighth embodiment and an electrode structure. The liquid crystal display device 10 of the eighth embodiment has the same configuration as that of the seventh embodiment except that a slit electrode is used as the pixel electrode 15 provided on the side of the first substrate 11 instead of a planar electrode, the pretilt angle defined by the second alignment film 23 between the first alignment film 22 and the second alignment film 23 is less than 90 degrees, and pretilt angle defined by the first alignment film 22 is substantially 90 degrees.

In the pixel electrode 15, a plurality of slits 15a extending in the lateral direction (0° direction) of the pixel 30 or extending in the longitudinal direction (90° direction) of the pixel 30 are formed. More specifically, as shown in FIG. 17, in the first domain 31 and the third domain 33, a slit extending in the 0° direction is formed, and in the second domain 32 and the fourth domain 34, a slit extending in the 90° direction is formed. On the other hand, the counter electrode 19 is a planar electrode (solid electrode) in which the slit 15a is not formed.

Figure 18:
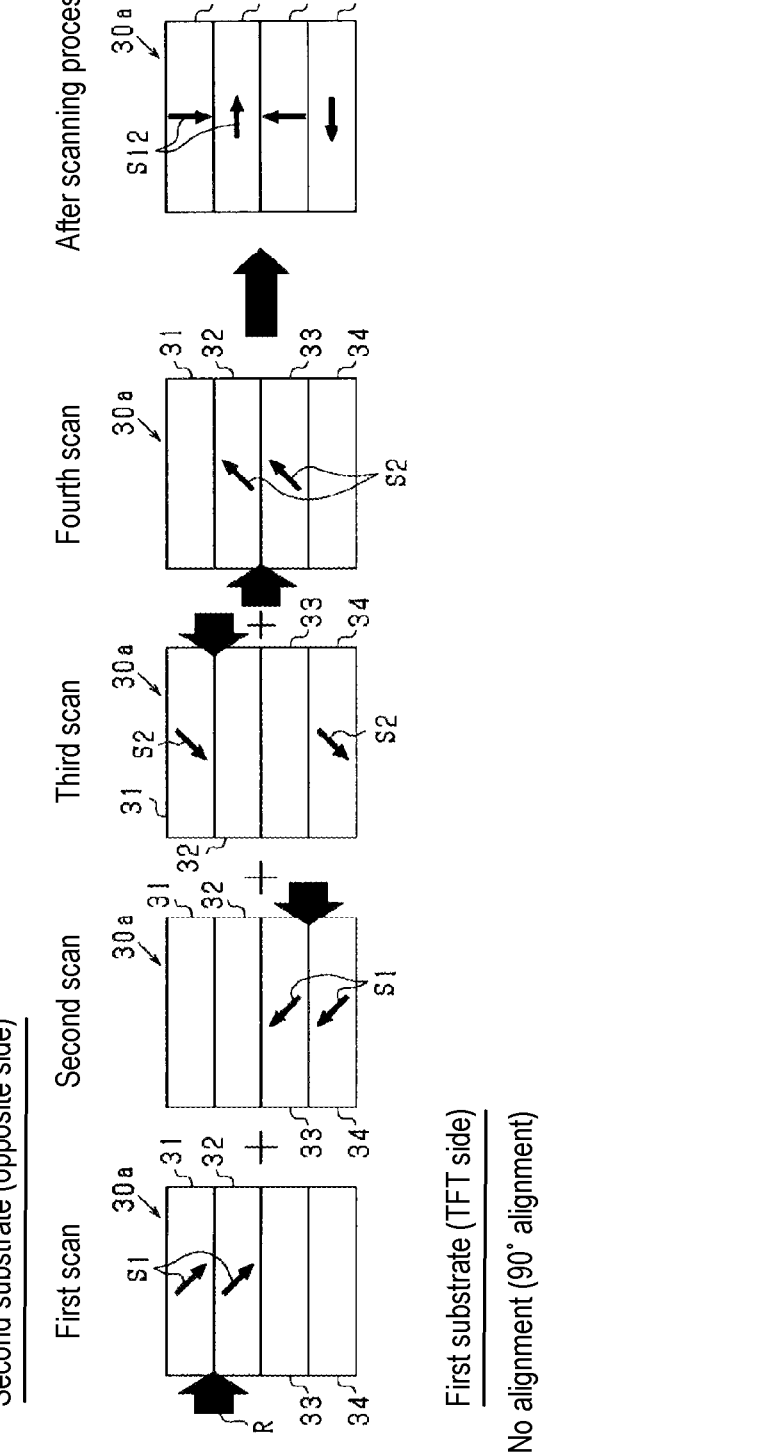
FIG. 18 is a schematic view showing an exposure process in a half pixel included in the liquid crystal display device of the eighth embodiment.

Also in the liquid crystal display device 10 of the eighth embodiment, the number of exposures for each of the plurality of liquid crystal domains within the half pixel 30a is plural and the same, and in each exposure, exposure is performed so that the previous numbers of exposures are the same among the liquid crystal domains to be exposed, and additionally, the combination of alignment imparting and a slit electrode is the same (refer to FIG. 18). Thereby, while dark lines can be made finer and thinner, it is possible to mitigate flicker due to a DC offset and minimize a variation in response speed of liquid crystal molecules.

OTHER EMBODIMENTS

The present disclosure is not limited to the above embodiments, and may be implemented, for example, as follows.

In the above embodiments, while a case in which, as the pixel electrode 15, the slit 15a is formed over the entire surface of the pixel region has been described, a slit may be formed only in a part of the pixel region (for example, the boundary between two adjacent domains or the outer edge of the pixel 30 in either the vertical direction or the horizontal direction).

The number of alignment divisions of the pixel and the shape of the pixel are not limited to the configurations of the above embodiments. For example, the present disclosure may be applied to a liquid crystal display device in which one pixel is alignment-divided into four regions. In addition, the content of the present disclosure may be applied to a liquid crystal display device including a pixel in which each side of the pixel is composed of a short side part extending in the vertical direction and a long side part extending in the horizontal direction.

According to the present disclosure described above, the following aspects are provided.

[Aspect 1] A liquid crystal display device having a plurality of pixels, including:
  a first substrate including a pixel electrode;
  a second substrate which is arranged to face the first substrate and includes a counter electrode;
  a liquid crystal layer which is arranged between the first substrate and the second substrate and includes liquid crystal molecules having negative dielectric anisotropy;
  a first alignment film formed on the first substrate;
  a second alignment film formed on the second substrate; and
  a pair of polarizing plates arranged outside the first substrate and the second substrate,
  wherein the pixel electrode has a slit,
  wherein at least one of the first alignment film and the second alignment film is a photo-alignment film whose alignment is divided by performing a plurality of exposures on a photosensitive organic film,
  wherein each pixel has a plurality of alignment regions in which directions in which a long axis direction of liquid crystal molecules present near the center of the liquid crystal layer in the thickness direction is projected onto the first substrate are different from each other due to the alignment division,
  wherein the number of exposures for each of the plurality of alignment regions for the alignment division is plural and the same among the regions,
  wherein, in each exposure for the alignment division, exposure is performed on two or more alignment regions in the arrangement direction, and the previous numbers of exposures in alignment regions to be exposed in each exposure are the same among the regions, and
  wherein an angle formed by a direction in which a long axis direction of liquid crystal molecules present near the center of the liquid crystal layer in the thickness direction in each of the plurality of alignment regions is projected onto the first substrate and a direction in which the polarizing axis of the polarizing plate extends is approximately 45°.

[Aspect 2] The liquid crystal display device according to [Aspect 1],
  wherein one of a pretilt angle defined by the first alignment film and a pretilt angle defined by the second alignment film is less than 90 degrees, and the other is substantially 90 degrees.

[Aspect 3] The liquid crystal display device according to [Aspect 2], wherein the pretilt angle defined by the second alignment film is less than 90 degrees.

[Aspect 4] A liquid crystal display device having a plurality of pixels, including:
  a first substrate including a pixel electrode;
  a second substrate which is arranged to face the first substrate and includes a counter electrode;
  a liquid crystal layer which is arranged between the first substrate and the second substrate and includes liquid crystal molecules having negative dielectric anisotropy;
  a first alignment film formed on the first substrate;
  a second alignment film formed on the second substrate; and
  a pair of polarizing plates arranged outside the first substrate and the second substrate, wherein the liquid crystal layer contains a chiral agent, wherein at least one of the first alignment film and the second alignment film is a photo-alignment film whose alignment is divided by performing a plurality of exposures on a photosensitive organic film, wherein each pixel has a plurality of alignment regions in which directions in which a long axis direction of liquid crystal molecules present near the center of the liquid crystal layer in the thickness direction is projected onto the first substrate are different from each other due to the alignment division, wherein the number of exposures for each of the plurality of alignment regions for the alignment division is plural and the same among the regions, wherein, in each exposure for the alignment division, exposure is performed on two or more alignment regions in the arrangement direction, and the previous numbers of exposures in alignment regions to be exposed in each exposure are the same among the regions, and wherein an angle formed by a direction in which a long axis direction of liquid crystal molecules present near the center of the liquid crystal layer in the thickness direction in each of the plurality of alignment regions is projected onto the first substrate and a direction in which the polarizing axis of the polarizing plate extends is approximately 45°.

[Aspect 5] The liquid crystal display device according to [Aspect 4], wherein one of a pretilt angle defined by the first alignment film and a pretilt angle defined by the second alignment film is less than 90 degrees, and the other is substantially 90 degrees, and the pixel electrode has a slit.

[Aspect 6] The liquid crystal display device according to [Aspect 5], wherein the pretilt angle defined by the second alignment film is less than 90 degrees.

[Aspect 7] The liquid crystal display device according to any one of [Aspect 1] to [Aspect 6].

wherein the number of exposures for each of the plurality of alignment regions is 2.

[Aspect 8] A method for manufacturing the liquid crystal display device according to any one of [Aspect 1] to [Aspect 7], including a film formation process in which a photosensitive organic film is formed on at least one of the first substrate and the second substrate and a photo-alignment treatment process in which a plurality of exposures are performed on the organic film, and thus a photo-alignment film whose alignment is divided is obtained so that a plurality of alignment regions in which directions in which a long axis direction of liquid crystal molecules present near the center of the liquid crystal layer in the thickness direction is projected onto the first substrate are different from each other are formed, wherein, in the photo-alignment treatment process, exposure is performed such that the number of exposures for each of the plurality of alignment regions for the alignment division is plural and the same among the regions, and in each exposure for the alignment division, exposure is performed on two or more alignment regions in the arrangement direction, and the previous numbers of exposures in alignment regions to be exposed in each exposure are the same among the regions.

EXAMPLES

Embodiments will be described below with reference to examples, but the present invention should not be construed as limited to the following examples.

Manufacturing of Liquid Crystal Alignment Agent

1. Synthesis of Polymer

Synthesis Example 1

0.0700 mol of 1,2,3,4-cyclobutanetetracarboxylic acid dianhydride, and 0.0769 mol of 2,2'-dimethyl-4,4'-diamino-biphenyl were dissolved in 170 g of N-methyl-2-pyrrolidone (NMP), and the mixture was reacted at 25° C. for 3 hours to obtain a solution containing 10 mass % of polyamic acid. Next, the polyamic acid solution was poured into a large excess of methanol to precipitate the reaction product. The obtained precipitate was washed with methanol and dried at 40° C. under a reduced pressure for 15 hours to obtain a polyamic acid (this is referred to as a "polymer (PAA-1)").

Synthesis Example 2

0.121 mol of 2,3,5-tricarboxycyclopentyl acetic acid dian-hydride, 0.109 mol of 6-{[((2E)-3-{4-[(4-(3,3,3-trifluoro-propoxy)benzoyl)oxy]phenyl}prop-2-enoyl)oxy]}hexyl-3, 5-diaminobenzoate, 0.00604 mol of 5ξ-cholestan-3-yl-2,4-diaminophenyl ether, and 0.00604 mol of 3,5-diaminobenzoic acid=5ξ-cholestan-3-yl were dissolved in 185.7 g of N-methyl-2-pyrrolidone (NMP), and the mixture was reacted at 60° C. for 24 hours. When the viscosity of the polymer solution was measured at 25° C. using an E-type rotational viscometer, it was 2,100 mPa·s. Next, the polyamic acid solution was poured into a large excess of methanol to precipitate the reaction product. The obtained precipitate was washed with methanol and dried at 40° C. under a reduced pressure for 15 hours to obtain a polyamic acid (this is referred to as a "polymer (PAA-2)").

Synthesis Example 3

Under nitrogen, 5.00 g of a compound represented by the following Formula (MI-1), 0.64 g of 4-vinylbenzoic acid, 2.82 g of 4-(2,5-dioxo-3-pyrrolin-1-yl)benzoic acid. 3.29 g of 4-(glycidyloxymethyl) styrene, 0.31 g of 2,2'-azobis(2,4-dimethylvaleronitrile) as a radical polymerization initiator, 0.52 g of 2,4-diphenyl-4-methyl-1-pentene as a chain trans-fer agent, and 25 ml of tetrahydrofuran as a solvent were put into a 100 mL two-neck flask, and polymerized at 70° C. for 5 hours. After re-precipitating in n-hexane, the precipitate was filtered and vacuum-dried at room temperature for 8 hours to obtain a styrene-maleimide polymer (this is referred to as a "polymer (PM-1)"). The weight average molecular weight (Mw) of the polymer (PM-1) was 30,000, and the molecular weight distribution (Mw/Mn) expressed as a ratio of the weight average molecular weight (Mw) to the number average molecular weight (Mn) was 2.

[Chem. 1]

The weight average molecular weight (Mw) and the number average molecular weight (Mn) of the polymer (PM-1) were polystyrene-equivalent values measured by gel permeation chromatography (GPC) under the following conditions.

Column: TSKgel GRCXLII, commercially available from Tosoh Corporation, Solvent: tetrahydrofuran
Temperature: 40° C.
Pressure: 68 kgf/cm²

2. Preparation of Liquid Crystal Alignment Agent (1) Preparation of Liquid Crystal Alignment Agent (AL-1)
NMP and butyl cellosolve (BC) as solvents were added to 80 parts by mass of the polymer (PAA-1), and 20 parts by mass of the polymer (PAA-2), and a solution having a solvent composition of NMP/BC=50/50 (mass ratio), and a solid content concentration of 4.0 mass % was obtained. The solution was filtered through a filter with a pore size of 1 μm to prepare a liquid crystal alignment agent (AL-1).
(2) Preparation of Liquid Crystal Alignment Agent (AL-2)
NMP and BC as solvents were added to 10 parts by mass of the polymer (PM-1), and 100 parts by mass of the polymer (PAA-1), and a solution having a solvent composition of NMP/BC-50/50 (mass ratio) and a solid content concentration of 4.0 mass % was obtained. The solution was filtered through a filter with a pore size 1 μm to prepare a liquid crystal alignment agent (AL-2).

3. Manufacturing of Liquid Crystal Display Element

Example 1

Using a slit electrode shown in FIG. 2 as an electrode (pixel electrode) of a TFT substrate, and a planar electrode as an electrode (counter electrode) of a counter substrate, a liquid crystal display element corresponding to the first embodiment was manufactured. First, the liquid crystal alignment agent (AL-1) was applied to each electrode arrangement surface of the TFT substrate and the counter substrate by a spin casting method. This was pre-baked at 80° C. for 1 minute, and then post-baked at 230° C. for 40 minutes to form a coating film with a film thickness of 120 nm.

Subsequently, scan exposure was performed on the coating film formed on the TFT substrate and the coating film formed on the counter substrate. According to FIG. 3, scan exposure was performed for each substrate a total of 4 times: the first scan, the second scan, the third scan and the fourth scan, and for both substrates a total of 8 times. Scan exposure was performed under conditions in which 313 nm linearly polarized light was emitted. In this case, in the first scan and the second scan, light was emitted at an intensity of 20 mJ/cm², and in the third scan and the fourth scan, light was emitted so that the tilt direction (that is, the tilt direction of the photo-alignment film) of each domain after the fourth scan was completed was the 45° direction with respect to the polarizing axis of the polarizing plate.

Subsequently, a nematic liquid crystal having negative dielectric anisotropy was added dropwise onto the alignment film formation surface of the TFT substrate. Then, a sealing member containing a thermosetting epoxy resin as a main component was arranged on the outer edge of the counter substrate, and the substrates were bonded to each other so that the alignment film formation surfaces of the TFT substrate and the counter substrate were inside. Then, the thermosetting epoxy resin was cured by heating at 130° C. for 1 hour to obtain a liquid crystal cell having a liquid crystal layer thickness (cell thickness) of 3.2 μm. In addition, in order to eliminate flow alignment during liquid crystal injection, the liquid crystal cell was heated at 150° C. and then slowly cooled to room temperature. Next, a pair of polarizing plates were bonded to both surfaces on the outer side of the substrate of the liquid crystal cell so that the directions in which the polarizing axes extended were 45° and 135°, and thereby a liquid crystal display element was obtained. The pretilt angle of the obtained liquid crystal display element was 89.0° on both the side of the TFT substrate and the side of the counter substrate. Here, the pretilt angle was a value measured using OPTI-Pro (commercially available from Shintec Corporation) (the same applies hereinafter).

Example 2

Using a slit electrode shown in FIG. 5 as an electrode (pixel electrode) of a TFT substrate and a planar electrode as an electrode (counter electrode) of a counter substrate, a liquid crystal display element corresponding to the second embodiment was manufactured. First, the liquid crystal alignment agent (AL-2) was applied to each electrode arrangement surface of the TFT substrate and the counter substrate by a spin casting method. This was pre-baked at 80° C. for 1 minute, and then post-baked at 230° C. for 40 minutes to form a coating film with a film thickness of 120 nm.

Subsequently, scan exposure was performed on the coating film formed on the counter substrate. According to FIG. 6, scan exposure was performed a total of 4 times: the first scan, the second scan, the third scan and the fourth scan. Exposure conditions were conditions in which, in the first scan and the second scan, 313 nm linearly polarized light was emitted at an intensity of 20 mJ/cm², and in the third scan and the fourth scan, 313 nm linearly polarized light was emitted so that the tilt direction of each domain after the fourth scan was completed was the 45° direction with respect to the polarizing axis of the polarizing plate. No light was emitted to the coating film formed on the TFT substrate.

Subsequently, a nematic liquid crystal having negative dielectric anisotropy was added dropwise onto the alignment film formation surface of the TFT substrate. Then, a sealing member containing a thermosetting epoxy resin as a main component was arranged on the outer edge of the counter substrate, and the substrates were bonded to each other so that the alignment film formation surfaces of the TFT substrate and the counter substrate were inside. Then, the thermosetting epoxy resin was cured by heating at 130° C. for 1 hour to obtain a liquid crystal cell having a liquid crystal layer thickness (cell thickness) of 3.2 μm. In addition, in order to eliminate flow alignment during liquid crystal injection, the liquid crystal cell was heated at 150° C. and then slowly cooled to room temperature. Next, a pair of polarizing plates were bonded to both surfaces on the outer side of the substrate of the liquid crystal cell so that the directions in which the polarizing axes extended were 45° and 135°, and thereby a liquid crystal display element was obtained. The pretilt angle of the obtained liquid crystal display element on the side of the counter substrate was 88.0°.

Example 3

Using a slit electrode shown in FIG. 7 as an electrode (pixel electrode) of a TFT substrate and a planar electrode as an electrode (counter electrode) of a counter substrate, a liquid crystal display element corresponding to the third embodiment was manufactured. First, the liquid crystal alignment agent (AL-2) was applied to each electrode arrangement surface of the TFT substrate and the counter substrate by a spin casting method. This was pre-baked at 80° C. for 1 minute, and then post-baked at 230° C. for 40 minutes to form a coating film with a film thickness of 120 nm.

Subsequently, scan exposure was performed on the coating film formed on the TFT substrate. According to FIG. 8, scan exposure was performed a total of 4 times: the first scan, the second scan, the third scan and the fourth scan. Exposure conditions were conditions in which, in the first scan and the second scan, 313 nm linearly polarized light was emitted at an intensity of 20 mJ/cm$^2$, and in the third scan and the fourth scan, 313 nm linearly polarized light was emitted so that the tilt direction of each domain after the fourth scan was completed was the 45° direction with respect to the polarizing axis of the polarizing plate. No light was emitted to the coating film formed on the counter substrate.

Subsequently, a nematic liquid crystal having negative dielectric anisotropy was added dropwise onto the alignment film formation surface of the TFT substrate. Then, a sealing member containing a thermosetting epoxy resin as a main component was arranged on the outer edge of the counter substrate, and the substrates were bonded to each other so that the alignment film formation surfaces of the TFT substrate and the counter substrate were inside. Then, the thermosetting epoxy resin was cured by heating at 130° C. for 1 hour to obtain a liquid crystal cell having a liquid crystal layer thickness (cell thickness) of 3.2 μm. In addition, in order to eliminate flow alignment during liquid crystal injection, the liquid crystal cell was heated at 150° C. and then slowly cooled to room temperature. Next, a pair of polarizing plates were bonded to both surfaces on the outer side of the substrate of the liquid crystal cell so that the directions in which the polarizing axes extended were 0 and 90°, and thereby a liquid crystal display element was obtained. The pretilt angle of the obtained liquid crystal display element on the side of the TFT substrate was 88.0°.

Example 4

Using a slit electrode shown in FIG. 9 as an electrode (pixel electrode) of a TFT substrate and a planar electrode as an electrode (counter electrode) of a counter substrate, a liquid crystal display element corresponding to the fourth embodiment was manufactured. First, the liquid crystal alignment agent (AL-2) was applied to each electrode arrangement surface of the TFT substrate and the counter substrate by a spin casting method. This was pre-baked at 80° C. for 1 minute, and then post-baked at 230° C. for 40 minutes to form a coating film with a film thickness of 120 nm.

Subsequently, scan exposure was performed on the coating film formed on the counter substrate. According to FIG. 10, scan exposure was performed a total of 4 times: the first scan, the second scan, the third scan and the fourth scan. Exposure conditions were conditions in which, in the first scan and the second scan, 313 nm linearly polarized light was emitted at an intensity of 20 mJ/cm$^2$, and in the third scan and the fourth scan, 313 nm linearly polarized light was emitted so that the tilt direction of each domain after the fourth scan was completed was the 45° direction with respect to the polarizing axis of the polarizing plate. No light was emitted to the coating film formed on the TFT substrate.

Subsequently, a nematic liquid crystal having negative dielectric anisotropy was added dropwise onto the alignment film formation surface of the TFT substrate. Then, a sealing member containing a thermosetting epoxy resin as a main component was arranged on the outer edge of the counter substrate, and the substrates were bonded to each other so that the alignment film formation surfaces of the TFT substrate and the counter substrate were inside. Then, the thermosetting epoxy resin was cured by heating at 130° C. for 1 hour to obtain a liquid crystal cell having a liquid crystal layer thickness (cell thickness) of 3.2 μm. In addition, in order to eliminate flow alignment during liquid crystal injection, the liquid crystal cell was heated at 150° C. and then slowly cooled to room temperature. Next, a pair of polarizing plates were bonded to both surfaces on the outer side of the substrate of the liquid crystal cell so that the directions in which the polarizing axes extended were 0° and 90°, and thereby a liquid crystal display element was obtained. The pretilt angle of the obtained liquid crystal display element on the side of the counter substrate was 88.0°.

Example 5

Using an electrode (pixel electrode) of a TFT substrate and a planar electrode as an electrode (counter electrode) of a counter substrate, a liquid crystal display element corresponding to the fifth embodiment was manufactured (refer to FIG. 11 and FIG. 12). First, the liquid crystal alignment agent (AL-1) was applied to each electrode arrangement surface of the TFT substrate and the counter substrate by a spin casting method. This was pre-baked at 80° C. for 1 minute, and then post-baked at 230° C. for 40 minutes to form a coating film with a film thickness of 120 nm.

Subsequently, scan exposure was performed on the coating film formed on the TFT substrate and the coating film formed on the counter substrate. According to FIG. 12, scan exposure was performed for each substrate a total of 4 times: the first scan, the second scan, the third scan and the fourth scan, and for both substrates a total of 8 times. Scan exposure was performed under conditions in which 313 nm linearly polarized light was emitted. In this case, in the first scan and the second scan, light was emitted at an intensity of 20 mJ/cm$^2$, and in the third scan and the fourth scan, light was emitted so that the tilt direction of each domain after the fourth scan was completed was the 45° direction with respect to the polarizing axis of the polarizing plate.

Subsequently, the liquid crystal composition A was added dropwise to the alignment film formation surface of the TFT substrate. The liquid crystal composition A was prepared by adding a chiral agent (product name "S-811," commercially available from Merck) to a nematic liquid crystal having negative dielectric anisotropy. When the liquid crystal composition A was prepared, the amount of the chiral agent added was adjusted so that the chiral pitch was 12.8 μm. The refractive indicator anisotropy (Δn) of the liquid crystal used was 0.14.

Then, a sealing member containing a thermosetting epoxy resin as a main component was arranged on the outer edge of the counter substrate, and the substrates were bonded to each other so that the alignment film formation surfaces of the TFT substrate and the counter substrate were inside. Then, the thermosetting epoxy resin was cured by heating at 130° C. for 1 hour to obtain a liquid crystal cell having a liquid crystal layer thickness (cell thickness) of 3.2 μm. In addition, in order to eliminate flow alignment during liquid crystal injection, the liquid crystal cell was heated at 150° C.

and then slowly cooled to room temperature. Next, a pair of polarizing plates were bonded to both surfaces on the outer side of the substrate of the liquid crystal cell so that the directions in which the polarizing axes extended were 0° and 90°, and thereby a liquid crystal display element was obtained. The pretilt angle of the obtained liquid crystal display element was 89.0° on both the side of the TFT substrate and the side of the counter substrate.

Example 6

Using a slit electrode shown in FIG. 13 as an electrode (pixel electrode) of a TFT substrate and a planar electrode as an electrode (counter electrode) of a counter substrate, a liquid crystal display element corresponding to the sixth embodiment was manufactured. First, the liquid crystal alignment agent (AL-1) was applied to each electrode arrangement surface of the TFT substrate and the counter substrate by a spin casting method. This was pre-baked at 80° C. for 1 minute, and then post-baked at 230° C. for 40 minutes to form a coating film with a film thickness of 120 nm.

Subsequently, scan exposure was performed on the coating film formed on the TFT substrate and the coating film formed on the counter substrate. According to FIG. 14, scan exposure was performed for each substrate a total of 4 times: the first scan, the second scan, the third scan and the fourth scan, and for both substrates a total of 8 times. Scan exposure was performed under conditions in which 313 nm linearly polarized light was emitted. In this case, in the first scan and the second scan, light was emitted at an intensity of 20 mJ/cm², and in the third scan and the fourth scan, light was emitted so that the tilt direction of each domain after the fourth scan was completed was the 45° direction with respect to the polarizing axis.

Subsequently, the liquid crystal composition A was added dropwise to the alignment film formation surface of the TFT substrate. Then, a sealing member containing a thermosetting epoxy resin as a main component was arranged on the outer edge of the counter substrate, and the substrates were bonded to each other so that the alignment film formation surfaces of the TFT substrate and the counter substrate were inside. Then, the thermosetting epoxy resin was cured by heating at 130° C. for 1 hour to obtain a liquid crystal cell having a liquid crystal layer thickness (cell thickness) of 3.2 μm. In addition, in order to eliminate flow alignment during liquid crystal injection, the liquid crystal cell was heated at 150° C. and then slowly cooled to room temperature. Next, a pair of polarizing plates were bonded to both surfaces on the outer side of the substrate of the liquid crystal cell so that the directions in which the polarizing axes extended were 0° and 90°, and thereby a liquid crystal display element was obtained. The pretilt angle of the obtained liquid crystal display element was 89.0° on both the side of the TFT substrate and the side of the counter substrate.

Example 7

Using an electrode (pixel electrode) of a TFT substrate and a planar electrode as an electrode (counter electrode) of a counter substrate, a liquid crystal display element corresponding to the seventh embodiment was manufactured (refer to FIG. 15 and FIG. 16). First, the liquid crystal alignment agent (AL-1) was applied to each electrode arrangement surface of the TFT substrate and the counter substrate by a spin casting method. This was pre-baked at 80° C. for 1 minute, and then post-baked at 230° C. for 40 minutes to form a coating film with a film thickness of 120 nm.

Subsequently, scan exposure was performed on the coating film formed on the TFT substrate and the coating film formed on the counter substrate. According to FIG. 16, scan exposure was performed for each substrate a total of 4 times: the first scan, the second scan, the third scan and the fourth scan, and for both substrates a total of 8 times. Scan exposure was performed under conditions in which 313 nm linearly polarized light was emitted. In this case, in the first scan and the second scan, light was emitted at an intensity of 20 mJ/cm², and in the third scan and the fourth scan, light was emitted so that the tilt direction of each domain after the fourth scan was completed was the 45° direction with respect to the polarizing axis of the polarizing plate.

Subsequently, the liquid crystal composition A was added dropwise to the alignment film formation surface of the TFT substrate. Then, a sealing member containing a thermosetting epoxy resin as a main component was arranged on the outer edge of the counter substrate, and the substrates were bonded to each other so that the alignment film formation surfaces of the TFT substrate and the counter substrate were inside. Then, the thermosetting epoxy resin was cured by heating at 130° C. for 1 hour to obtain a liquid crystal cell having a liquid crystal layer thickness (cell thickness) of 3.2 μm. In addition, in order to eliminate flow alignment during liquid crystal injection, the liquid crystal cell was heated at 150° C. and then slowly cooled to room temperature. Next, a pair of polarizing plates were bonded to both surfaces on the outer side of the substrate of the liquid crystal cell so that the directions in which the polarizing axes extended were 0° and 90°, and thereby a liquid crystal display element was obtained. The pretilt angle of the obtained liquid crystal display element was 89.0° on both the side of the TFT substrate and the side of the counter substrate.

Example 8

Using a slit electrode shown in FIG. 17 as an electrode (pixel electrode) of a TFT substrate and a planar electrode as an electrode (counter electrode) of a counter substrate, a liquid crystal display element corresponding to the eighth embodiment was manufactured. First, the liquid crystal alignment agent (AL-2) was applied to each electrode arrangement surface of the TFT substrate and the counter substrate by a spin casting method. This was pre-baked at 80° C. for 1 minute, and then post-baked at 230° C. for 40 minutes to form a coating film with a film thickness of 120 nm.

Subsequently, scan exposure was performed on the coating film formed on the counter substrate. According to FIG. 18, scan exposure was performed a total of 4 times: the first scan, the second scan, the third scan and the fourth scan. Exposure conditions were conditions in which, in the first scan and the second scan, 313 nm linearly polarized light was emitted at an intensity of 20 mJ/cm², and in the third scan and the fourth scan, 313 nm linearly polarized light was emitted so that the tilt direction of each domain after the fourth scan was completed was the 45° direction with respect to the polarizing axis of the polarizing plate. No light was emitted to the coating film formed on the TFT substrate.

Subsequently, the liquid crystal composition A was added dropwise to the alignment film formation surface of the TFT substrate. Then, a sealing member containing a thermosetting epoxy resin as a main component was arranged on the outer edge of the counter substrate, and the substrates were bonded to each other so that the alignment film formation surfaces of the TFT substrate and the counter substrate were inside. Then, the thermosetting epoxy resin was cured by heating at 130° C. for 1 hour to obtain a liquid crystal cell having a liquid crystal layer thickness (cell thickness) of 3.2 μm. In addition, in order to eliminate flow alignment during liquid crystal injection, the liquid crystal cell was heated at 150° C. and then slowly cooled to room temperature. Next, a pair of polarizing plates were bonded to both surfaces on the outer side of the substrate of the liquid crystal cell so that the directions in which the polarizing axes extended were 0° and 90°, and thereby a liquid crystal display element was obtained. The pretilt angle of the obtained liquid crystal display element on the side of the counter substrate was 88.0°.

Comparative Example 1

Figure 19:
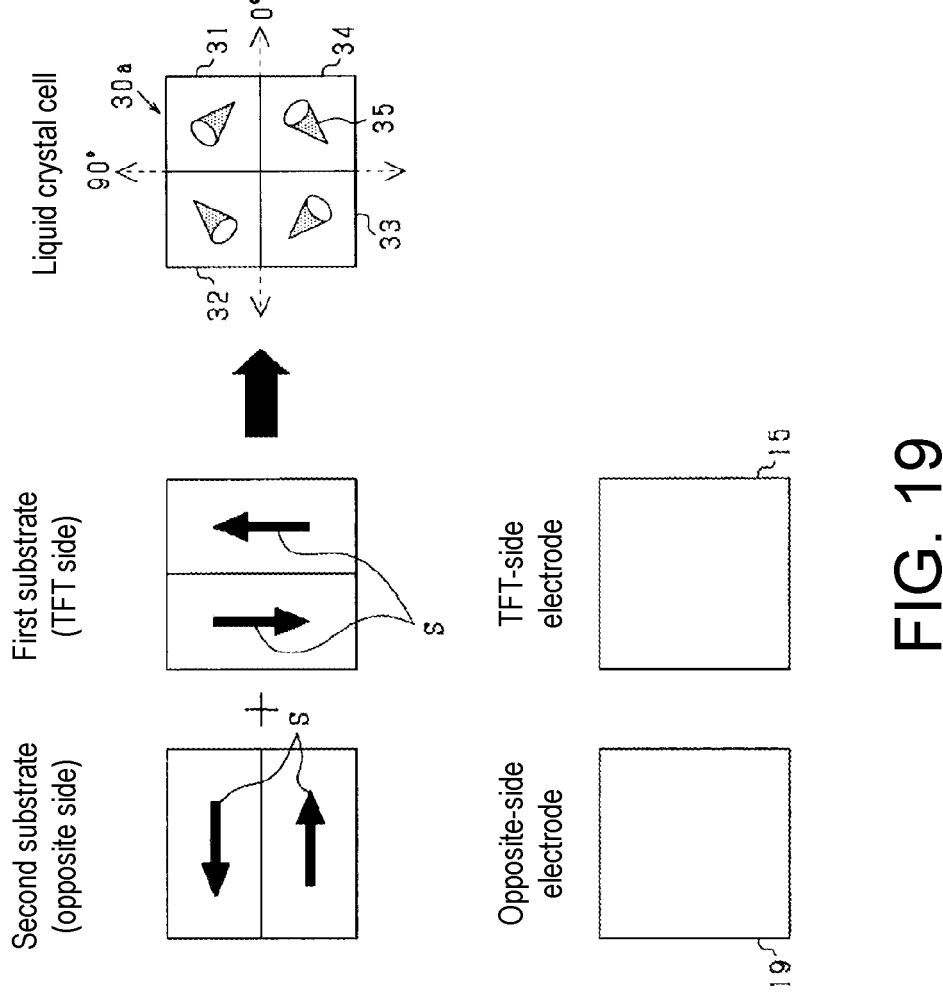
FIG. 19 is a schematic view showing a tilt direction and an alignment direction in a half pixel included in a liquid crystal display device of Comparative Example 1.

Using an electrode (pixel electrode) of a TFT substrate and a planar electrode as an electrode (counter electrode) of a counter substrate, a liquid crystal display element including a half pixel shown in FIG. 19 was manufactured. First, the liquid crystal alignment agent (AL-1) was applied to each electrode arrangement surface of the TFT substrate and the counter substrate by a spin casting method. This was pre-baked at 80° C. for 1 minute, and then post-baked at 230° C. for 40 minutes to form a coating film with a film thickness of 120 nm. In FIG. 19, the arrow with the reference numeral S indicates a tilt direction (that is, the tilt direction of the photo-alignment film) of each liquid crystal domain imparted to the photosensitive organic film.

Figure 20:
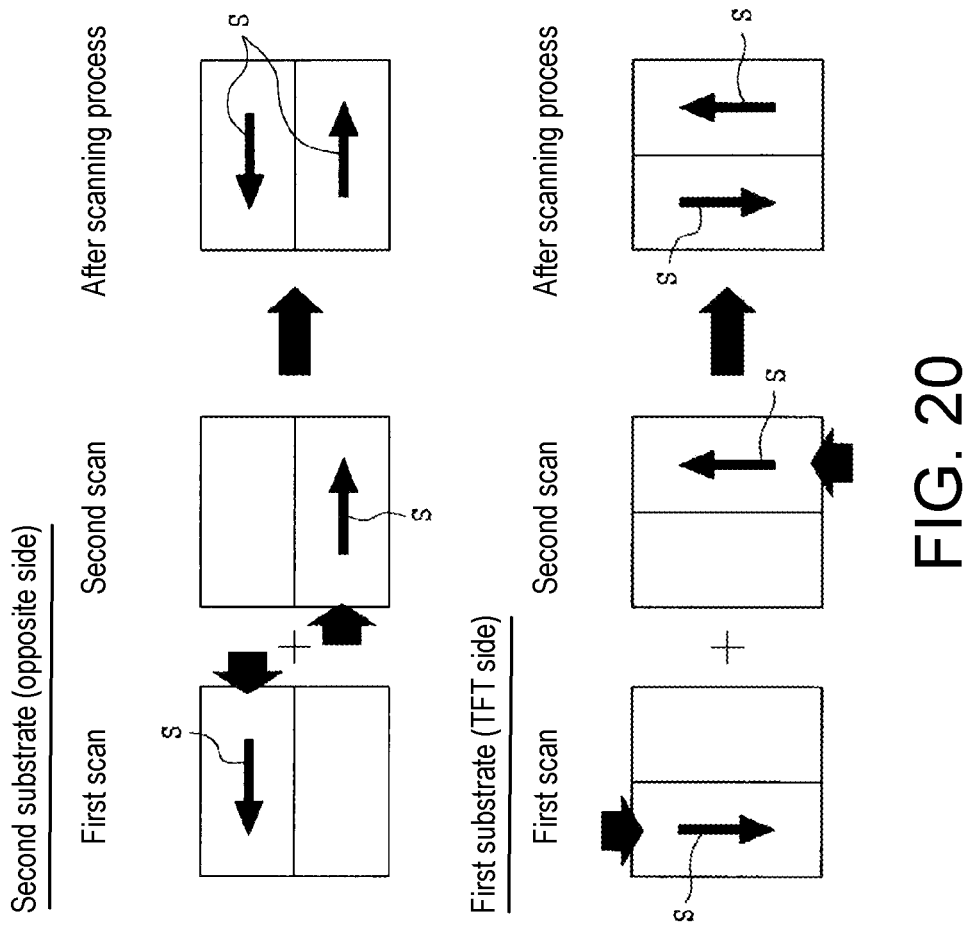
FIG. 20 is a schematic view showing an exposure process in a half pixel included in the liquid crystal display device of Comparative Example 1.

Subsequently, scan exposure was performed on the coating film formed on the TFT substrate and the coating film formed on the counter substrate. According to FIG. 20, scan exposure was performed for each substrate a total of twice in the first scan and the second scan, and for both substrates for a total of 4 times. In the exposure conditions in FIG. 20, the number of exposures per domain was 1 for each of the TFT substrate and the counter substrate. Exposure conditions were conditions in which 313 nm linearly polarized light was emitted at an intensity of 20 mJ/cm$^2$ in both the first scan and the second scan.

Subsequently, a nematic liquid crystal having negative dielectric anisotropy was added dropwise onto the alignment film formation surface of the TFT substrate. Then, a sealing member containing a thermosetting epoxy resin as a main component was arranged on the outer edge of the counter substrate, and the substrates were bonded to each other so that the alignment film formation surfaces of the TFT substrate and the counter substrate were inside. Then, the thermosetting epoxy resin was cured by heating at 130° C. for 1 hour to obtain a liquid crystal cell having a liquid crystal layer thickness (cell thickness) of 3.2 μm. In addition, in order to eliminate flow alignment during liquid crystal injection, the liquid crystal cell was heated at 150° C. and then slowly cooled to room temperature. Next, a pair of polarizing plates were bonded to both surfaces on the outer side of the substrate of the liquid crystal cell so that the directions in which the polarizing axes extended were 0° and 90°, and thereby a liquid crystal display element was obtained. The pretilt angle of the obtained liquid crystal display element on the side of the counter substrate was 89.0°.

Comparative Example 2

Figure 21:
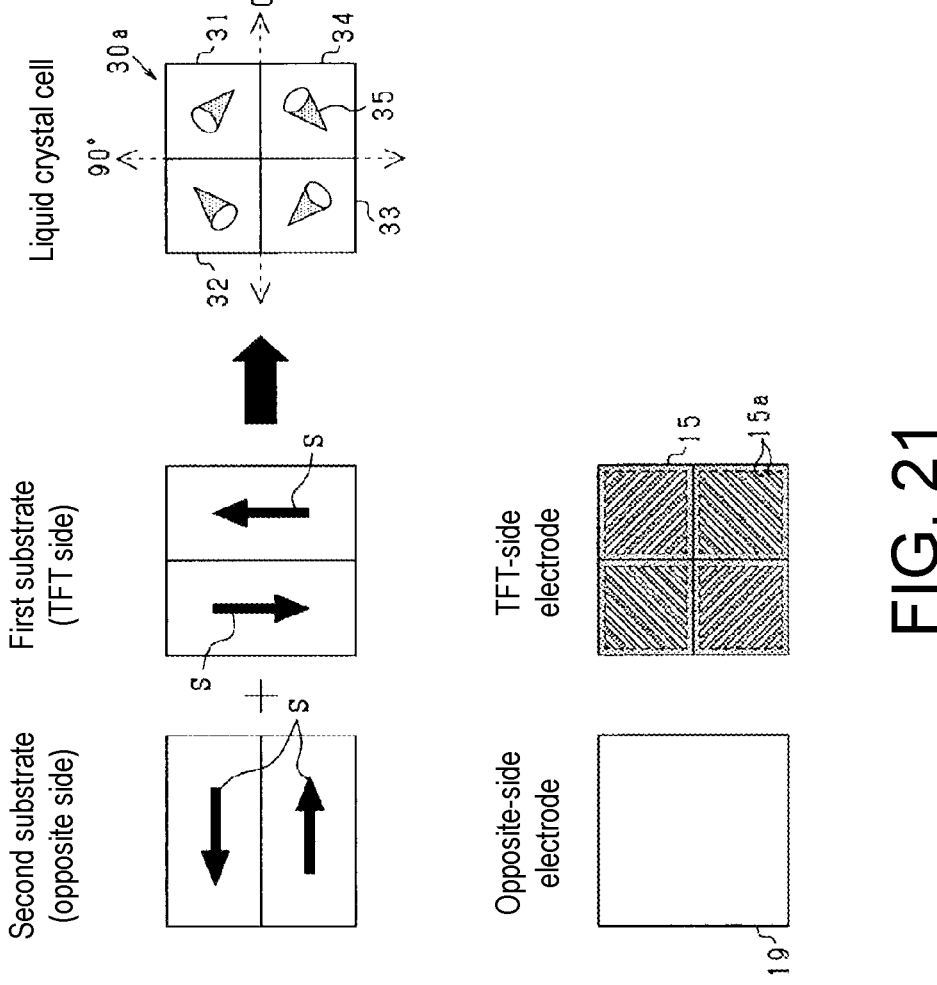
FIG. 21 is a schematic view showing a tilt direction and an alignment direction in a half pixel included in a liquid crystal display device of Comparative Example 2.

Using a slit electrode (the same oblique slit electrode as in Example 3) shown in FIG. 21 as an electrode (pixel electrode) of a TFT substrate and a planar electrode as an electrode (counter electrode) of a counter substrate, a liquid crystal display element including a half pixel shown in FIG. 21 was manufactured. First, the liquid crystal alignment agent (AL-1) was applied to each electrode arrangement surface of the TFT substrate and the counter substrate by a spin casting method. This was pre-baked at 80° C. for 1 minute, and then post-baked at 230° C. for 40 minutes to form a coating film with a film thickness of 120 nm.

Figure 22:
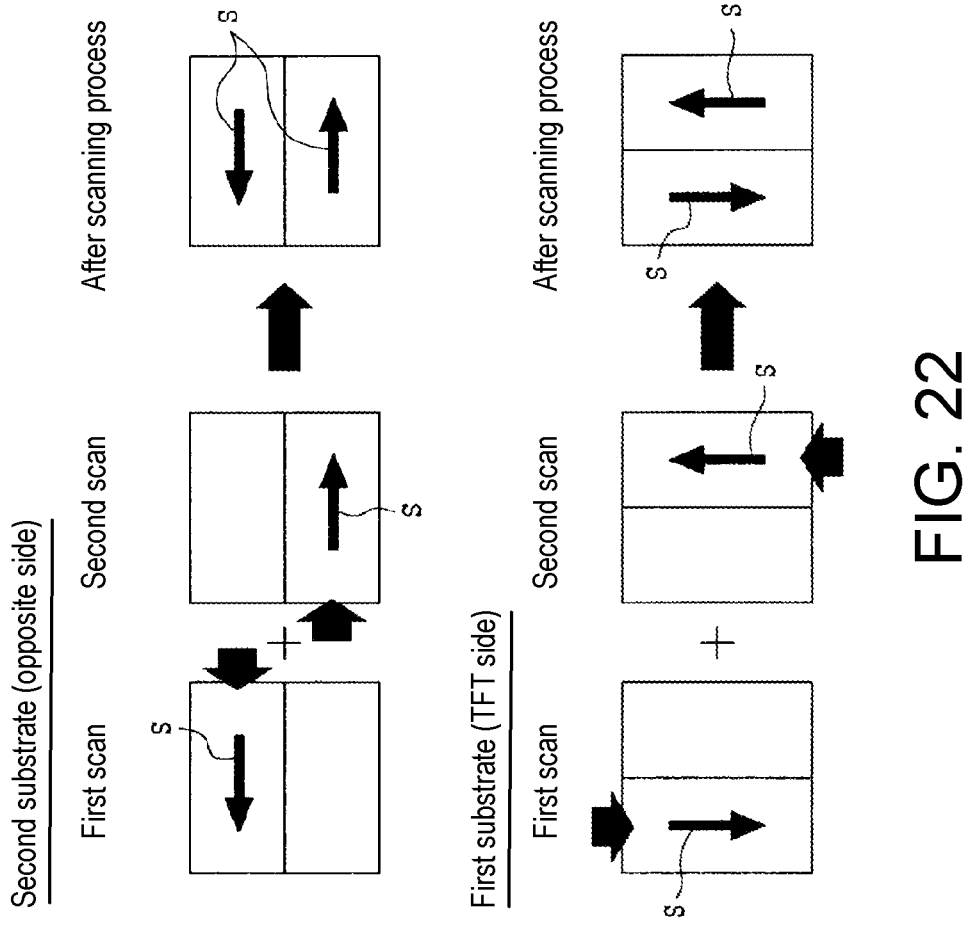
FIG. 22 is a schematic view showing an exposure process in a half pixel included in the liquid crystal display device of Comparative Example 2.

Subsequently, scan exposure was performed on the coating film formed on the TFT substrate and the coating film formed on the counter substrate. According to FIG. 22, scan exposure was performed for each substrate a total of twice in the first scan and the second scan, and for both substrates for a total of 4 times. In the exposure conditions in FIG. 22, the number of exposures per domain was 1 for each coating film on the side of the TFT substrate and the side of the counter substrate. Exposure conditions were conditions in which 313 nm linearly polarized light was emitted at an intensity of 20 mJ/cm$^2$ in both the first scan and the second scan.

Subsequently, a nematic liquid crystal having negative dielectric anisotropy was added dropwise onto the alignment film formation surface of the TFT substrate. Then, a sealing member containing a thermosetting epoxy resin as a main component was arranged on the outer edge of the counter substrate, and the substrates were bonded to each other so that the alignment film formation surfaces of the TFT substrate and the counter substrate were inside. Then, the thermosetting epoxy resin was cured by heating at 130° C. for 1 hour to obtain a liquid crystal cell having a liquid crystal layer thickness (cell thickness) of 3.2 μm. In addition, in order to eliminate flow alignment during liquid crystal injection, the liquid crystal cell was heated at 150° C. and then slowly cooled to room temperature. Next, a pair of polarizing plates were bonded to both surfaces on the outer side of the substrate of the liquid crystal cell so that the directions in which the polarizing axes extended were 0° and 90°, and thereby a liquid crystal display element was obtained. The pretilt angle of the obtained liquid crystal display element on the side of the counter substrate was 89.0°.

Comparative Example 3

Figure 23:
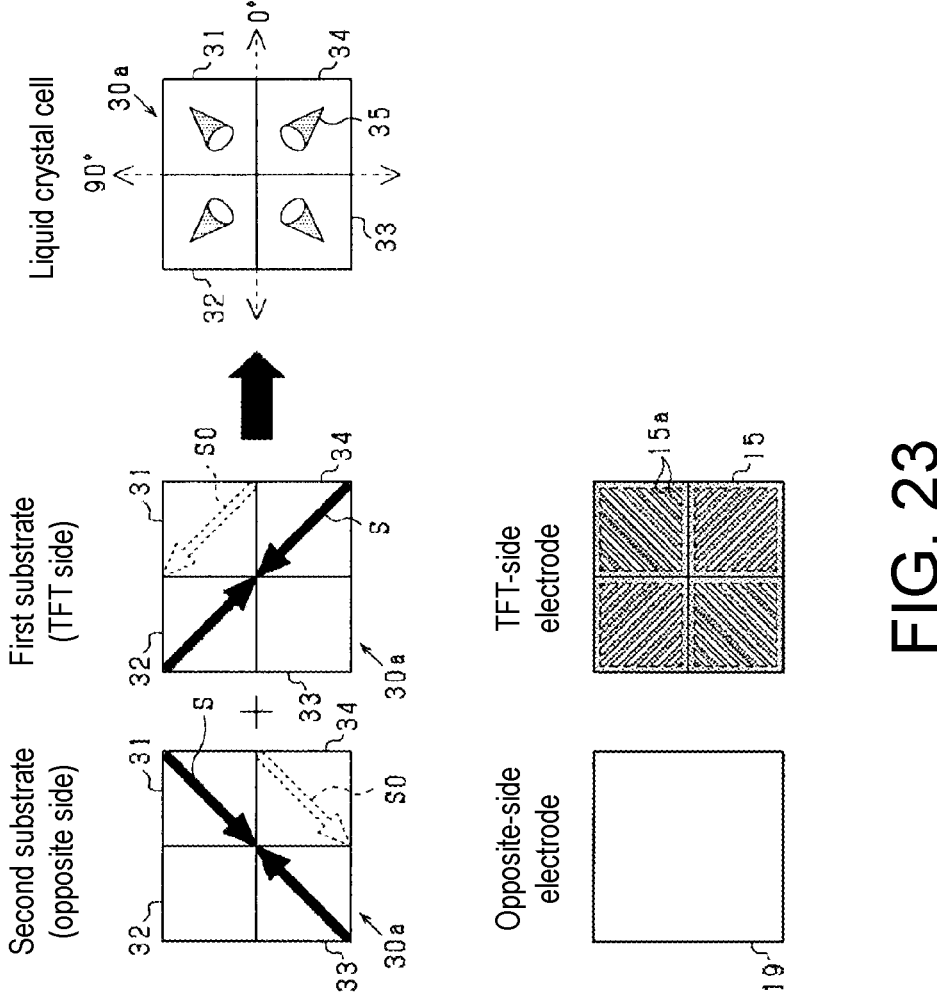
FIG. 23 is a schematic view showing a tilt direction and an alignment direction in a half pixel included in a liquid crystal display device of Comparative Example 3.

Using a slit electrode (an oblique slit electrode in which a slit extending in the 45° direction was formed in the first domain 31 and the third domain 33 and a slit extending in the 135° direction was formed in the second domain 32 and the fourth domain 34) shown in FIG. 23 as an electrode (pixel electrode) of a TFT substrate, and a planar electrode as an electrode (counter electrode) of a counter substrate, a liquid crystal display element including a half pixel shown in FIG. 23 was manufactured. First, the liquid crystal alignment agent (AL-1) was applied to each electrode arrangement surface of the TFT substrate and the counter substrate by a spin casting method. This was pre-baked at 80° C. for 1 minute, and then post-baked at 230° C. for 40 minutes to form a coating film with a film thickness of 120 nm.

Figure 24:
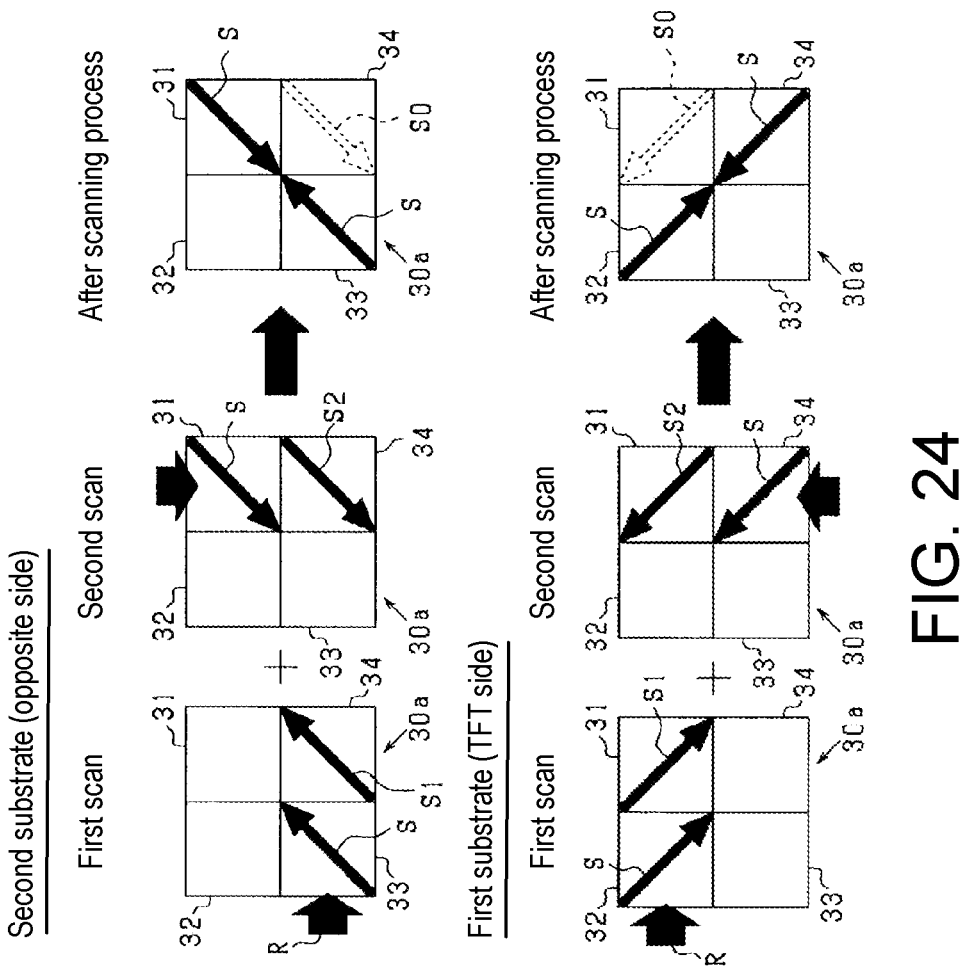
FIG. 24 is a schematic view showing an exposure process in a half pixel included in the liquid crystal display device of Comparative Example 3.

Subsequently, scan exposure was performed on the coating film formed on the TFT substrate and the coating film formed on the counter substrate. According to FIG. 24, scan exposure was performed for each substrate a total of twice in the first scan and the second scan, and for both substrates for a total of 4 times. In the exposure conditions in FIG. 24, for the coating film formed on the TFT substrate, the number of exposures in the first domain 31 was 2, the number of exposures in the second domain 32 and the fourth domain 34 was 1, and the number of exposures in the third domain 33 was 0. In addition, for the coating film of the counter substrate, the number of exposures in the first domain 31 was 2, the number of exposures in the second domain 32 and the fourth domain 34 was 1, and the number of exposures in the third domain 33 was 0. Here, in FIG. 23 and FIG. 24, an arrow S0 indicated by a broken line represents a tilt direction after double exposure with the tilt direction in the opposite direction. Scan exposure was performed under conditions in which 313 nm linearly polarized light was emitted. In this case, in the first scan, light was emitted at an intensity of 20 mJ/cm$^2$, and in the second scan, light was emitted so that an arrow S0 indicates a pretilt angle of substantially 90°.

Subsequently, a nematic liquid crystal having negative dielectric anisotropy was added dropwise onto the alignment film formation surface of the TFT substrate. Then, a sealing member containing a thermosetting epoxy resin as a main component was arranged on the outer edge of the counter substrate, and the substrates were bonded to each other so that the alignment film formation surfaces of the TFT substrate and the counter substrate were inside. Then, the thermosetting epoxy resin was cured by heating at 130° C. for 1 hour to obtain a liquid crystal cell having a liquid crystal layer thickness (cell thickness) of 3.2 μm. In addition, in order to eliminate flow alignment during liquid crystal injection, the liquid crystal cell was heated at 150° C. and then slowly cooled to room temperature. Next, a pair of polarizing plates were bonded to both surfaces on the outer side of the substrate of the liquid crystal cell so that the directions in which the polarizing axes extended were 0° and 90°, and thereby a liquid crystal display element was obtained. The pretilt angle of the obtained liquid crystal display element on the side of the counter substrate was 89.0°.

Comparative Example 4

Figure 25:
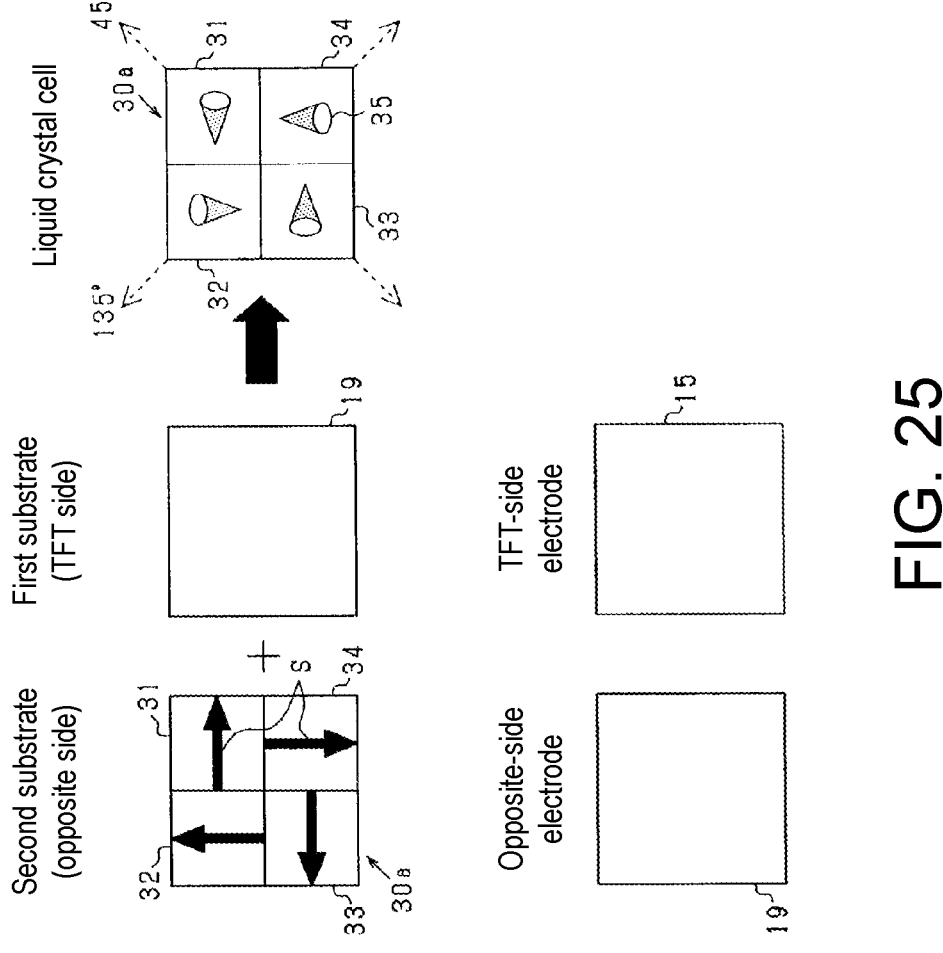
FIG. 25 is a schematic view showing a tilt direction and an alignment direction in a half pixel included in a liquid crystal display device of Comparative Example 4.
Figure 26:
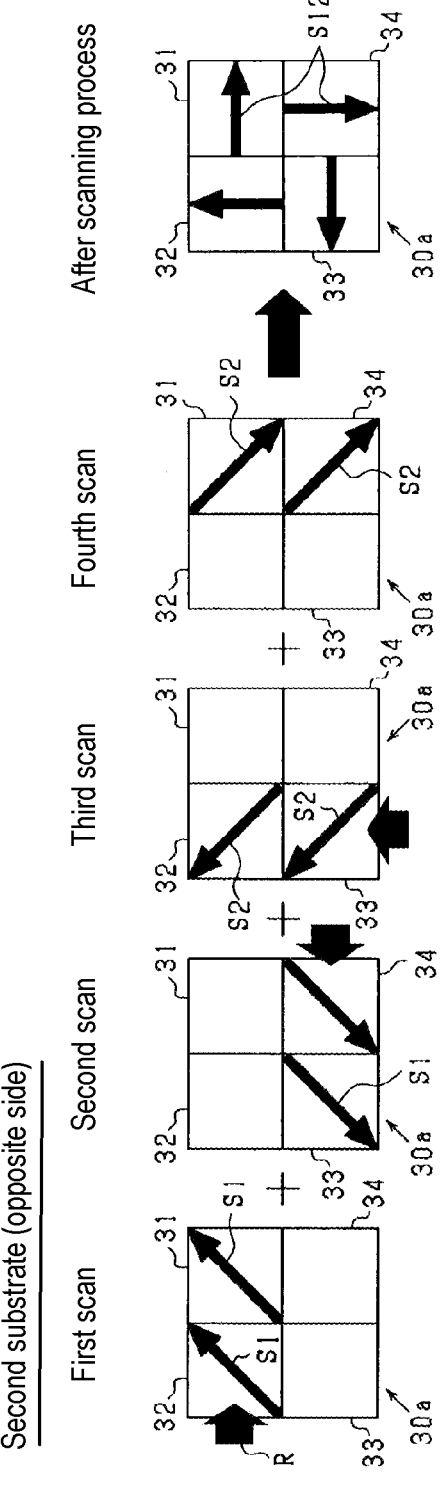
FIG. 26 is a schematic view showing an exposure process in a half pixel included in a liquid crystal display device of Comparative Example 4.

The same treatment as in Example 2 was performed except that a planar electrode was used as an electrode (pixel electrode) of a TFT substrate instead of a slit electrode (refer to FIG. 25 and FIG. 26).

Comparative Example 5

Figure 27:
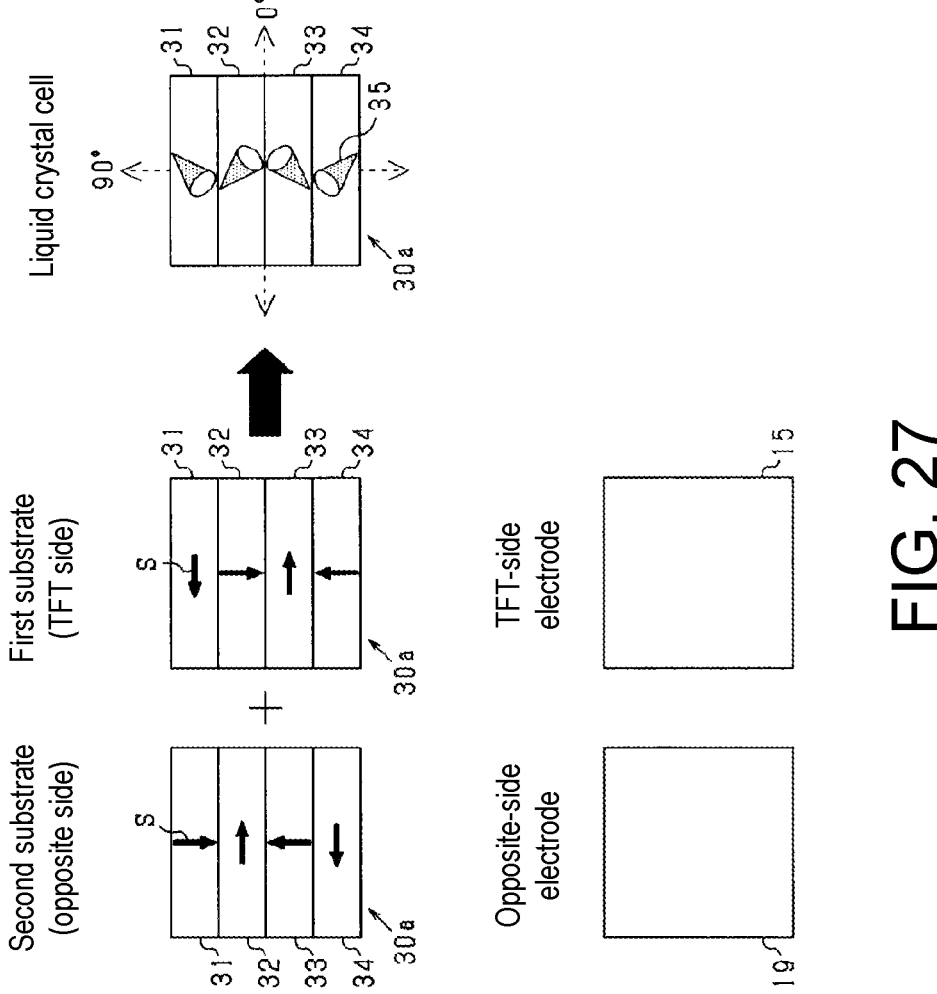
FIG. 27 is a schematic view showing an exposure process in a half pixel included in a liquid crystal display device of Comparative Example 5.

Using an electrode (pixel electrode) of a TFT substrate and a planar electrode as an electrode (counter electrode) of a counter substrate, a liquid crystal display element including a half pixel shown in FIG. 27 was manufactured. First, the liquid crystal alignment agent (AL-2) was applied to each electrode arrangement surface of the TFT substrate and the counter substrate by a spin casting method. This was pre-baked at 80° C. for 1 minute, and then post-baked at 230° C. for 40 minutes to form a coating film with a film thickness of 120 nm.

Figure 28:
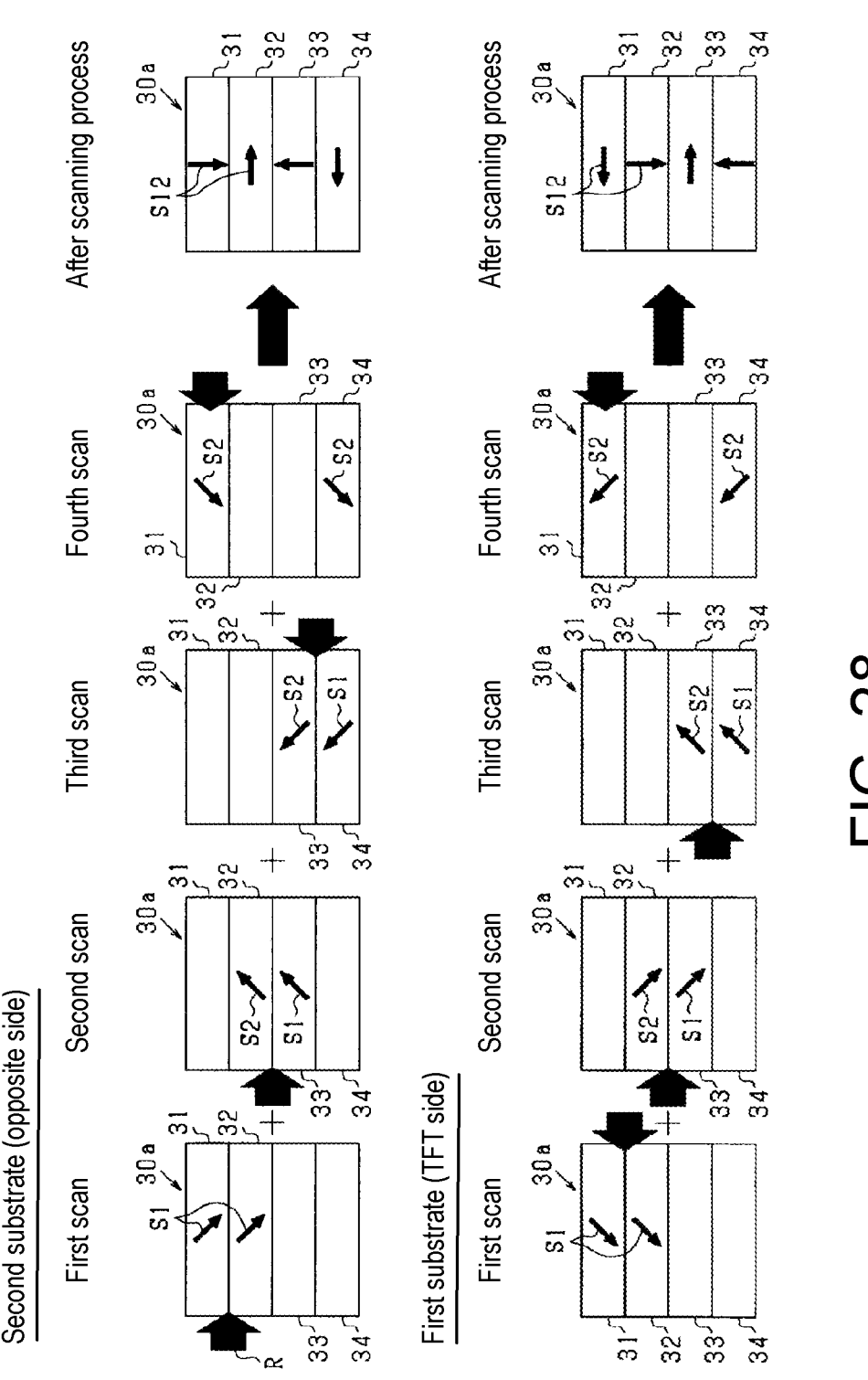
FIG. 28 is a schematic view showing a tilt direction and an alignment direction in a half pixel included in the liquid crystal display device of Comparative Example 5.

Subsequently, scan exposure was performed on the coating film formed on the TFT substrate and the coating film formed on the counter substrate. According to FIG. 28, scan exposure was performed for each substrate a total of 4 times: the first scan, the second scan, the third scan and the fourth scan, and for both substrates a total of 8 times. The exposure conditions for each exposure from the first scan to the fourth scan were the same as in Example 7.

Subsequently, the liquid crystal composition A was added dropwise to the alignment film formation surface of the TFT substrate. Then, a sealing member containing a thermosetting epoxy resin as a main component was arranged on the outer edge of the counter substrate, and the substrates were bonded to each other so that the alignment film formation surfaces of the TFT substrate and the counter substrate were inside. Then, the thermosetting epoxy resin was cured by heating at 130° C. for 1 hour to obtain a liquid crystal cell having a liquid crystal layer thickness (cell thickness) of 3.2 μm. In addition, in order to eliminate flow alignment during liquid crystal injection, the liquid crystal cell was heated at 150° C. and then slowly cooled to room temperature. Next, a pair of polarizing plates were bonded to both surfaces on the outer side of the substrate of the liquid crystal cell so that the directions in which the polarizing axes extended were 0° and 90°, and thereby a liquid crystal display element was obtained. In the liquid crystal display element, in the second scan and the third scan of each exposure in the alignment division process, the liquid crystal domain for the first exposure and the liquid crystal domain for the second exposure were mixed. Specifically, in the second scan, the third domain 33 was for the first exposure, and the second domain 32 was for the second exposure, and in the third scan, the fourth domain 34 was for the first exposure, and the third domain 33 was for the second exposure. Therefore, a desired tilt direction could not be imparted to each domain by double exposure, and as a result, a predetermined alignment direction and a pretilt angle could not be exhibited in any of the four domains.

Here, the amount of light emission required to obtain a predetermined alignment direction was different between the first exposure and the second exposure. Therefore, as in Comparative Example 5, when the previous numbers of exposures in alignment regions to be exposed in each exposure were not the same between regions, it was determined that a predetermined alignment direction and a pretilt angle could not be exhibited.

Reference Example 1

Figure 29:
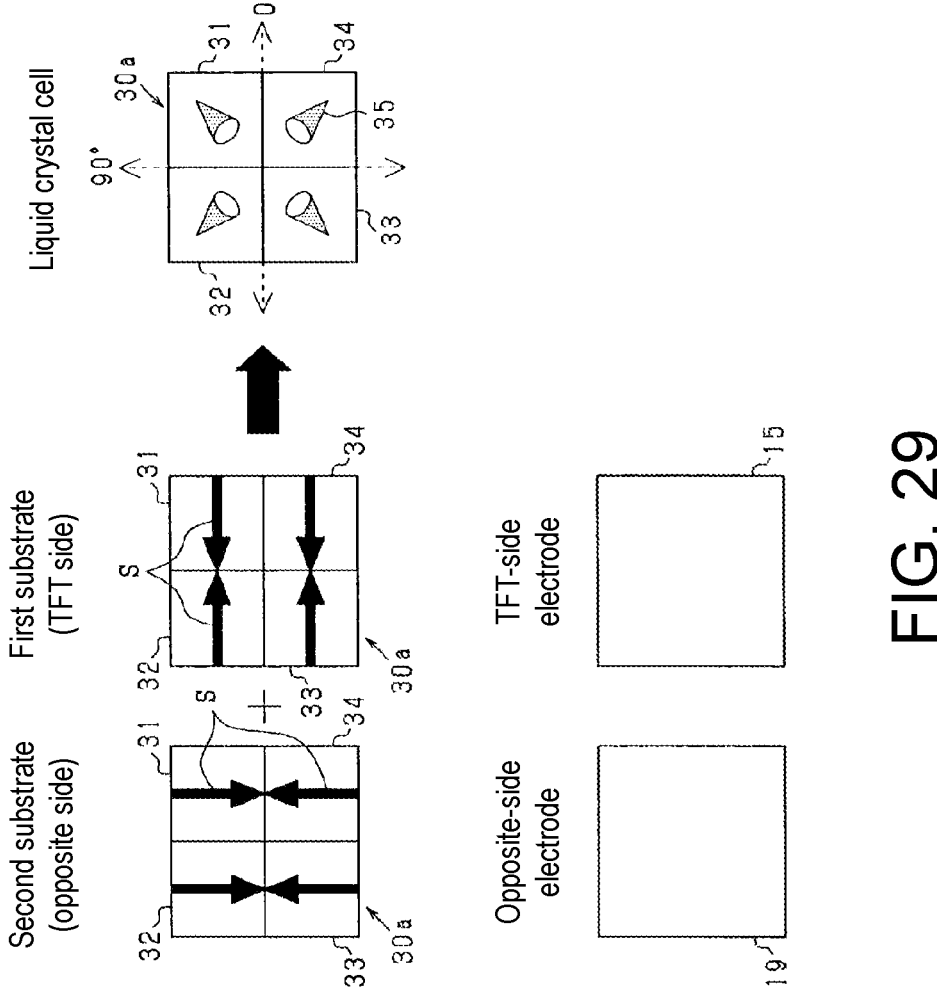
FIG. 29 is a schematic view showing an exposure process in a half pixel included in a liquid crystal display device of Reference Example 1.
Figure 30:
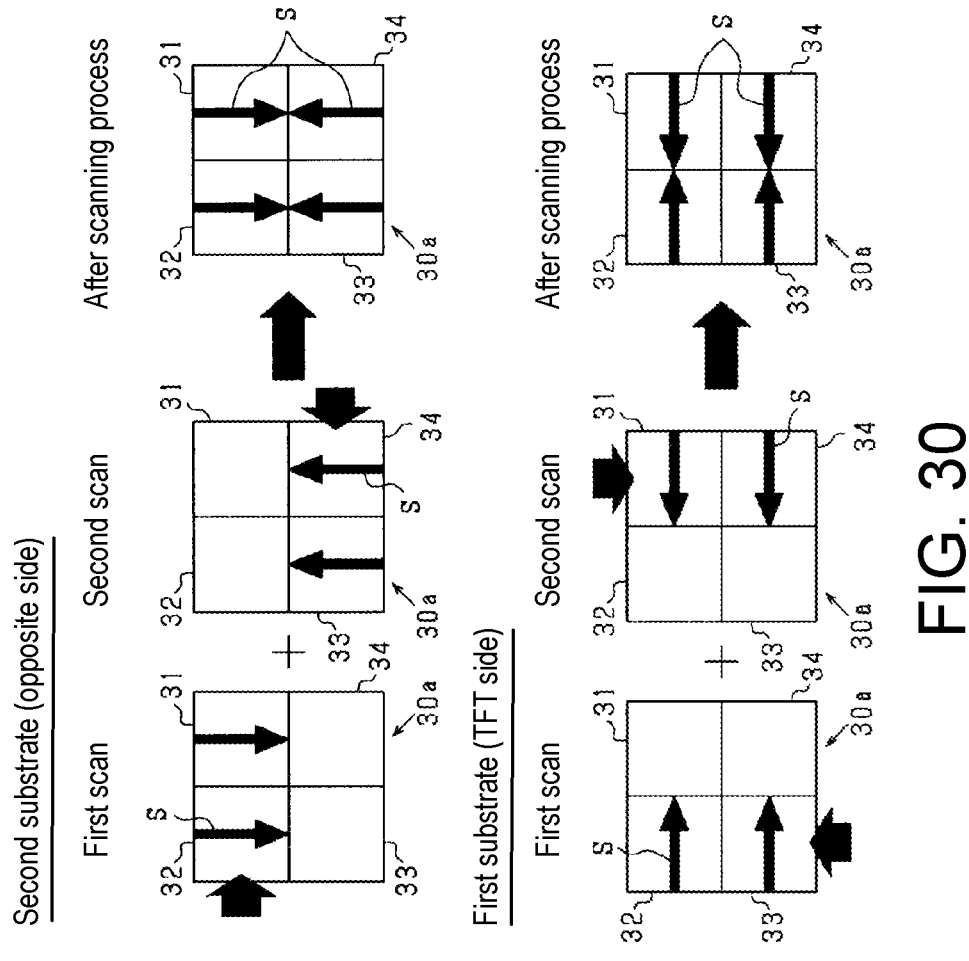
FIG. 30 is a schematic view showing a tilt direction and an alignment direction in a half pixel included in a liquid crystal display device of Reference Example 2.

Using an electrode (pixel electrode) of a TFT substrate and a planar electrode as an electrode (counter electrode) of a counter substrate, when a liquid crystal display element including a half pixel shown in FIG. 29 (direction in which the polarizing axis extends: 0°, 90°) was manufactured under exposure conditions shown in FIG. 30, scan exposure could not be performed by the current exposure device shown in FIG. 4. This is because the direction in which liquid crystal molecules were aligned was perpendicular to the scan direction in the exposure device, which made it difficult to apply conventional exposure devices. In order to address this problem, it is necessary to develop a new exposure device. In addition, such a new exposure device is larger than a conventional exposure device, and leads to an increase in manufacturing cost. In addition, another issue is that the manufacturing itself is difficult.

4. Evaluation of Liquid Crystal Display Element

The following evaluations (1) to (5) were performed on the liquid crystal display elements manufactured in Examples 1 to 8 and Comparative Examples 1 to 4. The evaluation results are shown in Table 1. Here, in Comparative Example 5, no evaluation was performed because a desired tilt direction and a pretilt angle could not be exhibited in all pixels. In addition, in Reference Example 1, since current scan exposure could not be applied, and a liquid crystal display element was not evaluated, and thus each column of evaluation items other than exposure process applicability is indicated as "-" in Table 1.

(1) Evaluation of Dark Line Condition

Figure 31:
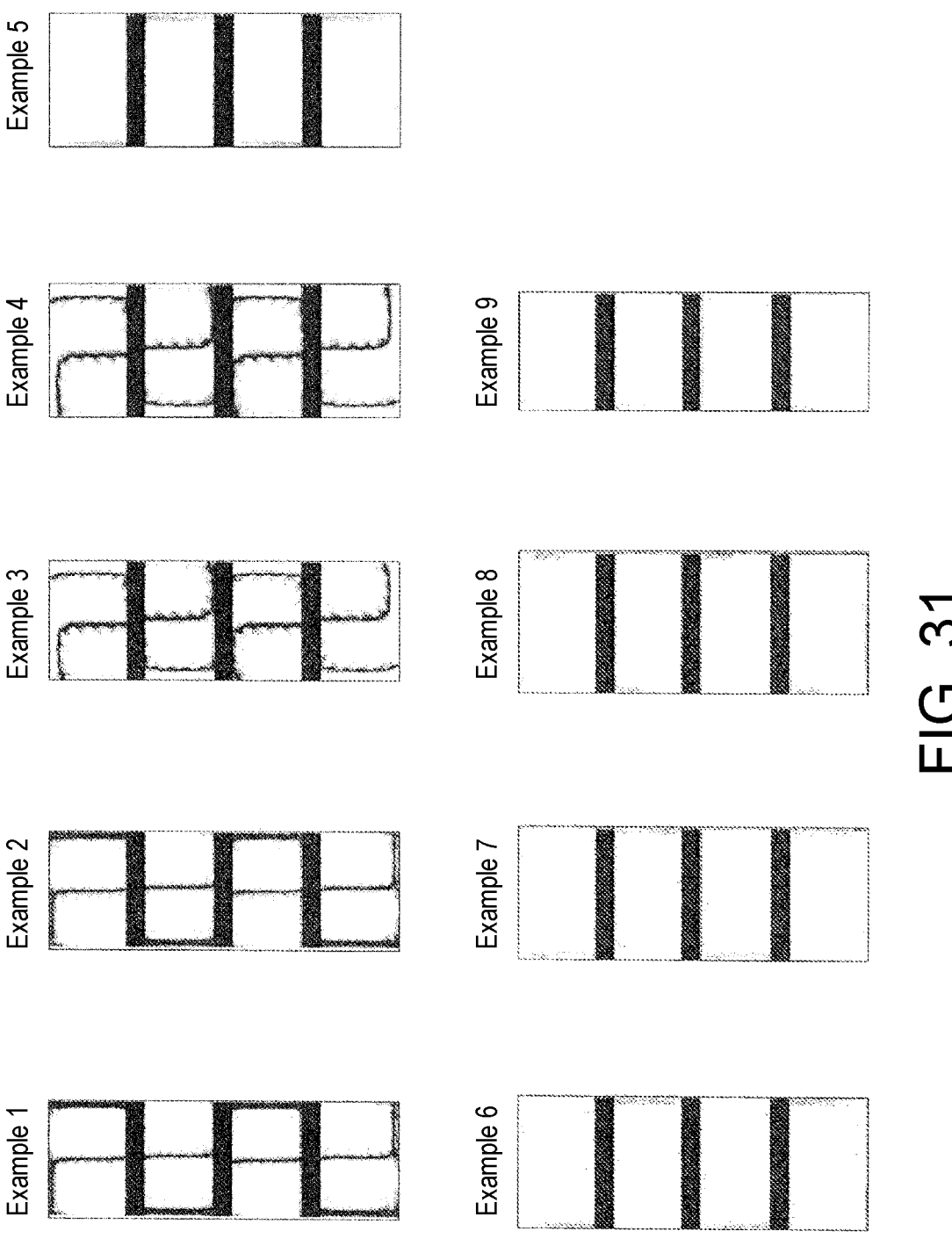
FIG. 31 is a diagram showing simulation results of liquid crystal display elements of Examples 1 to 8.
Figure 32:
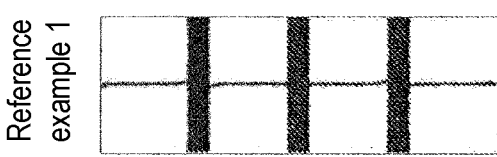
FIG. 32 is a diagram showing simulation results of liquid crystal display elements of Comparative Examples 1 to 4 and Reference Example 1.
Figure 32:
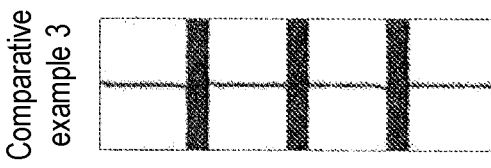
Figure 32:
Figure 32:
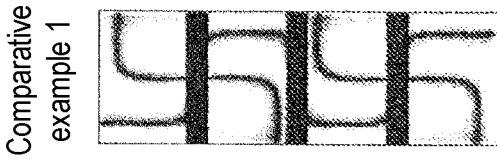

Using Expert LCD (commercially available from Link-Global21), the driving state of the liquid crystal display element was confirmed by simulation. Calculation conditions applied were: cell gap: 3.2 μm, pretilt angle: measured value (in Example 1, 89.0° on both the side of the TFT substrate and the side of the counter substrate), applied voltage: 6 V, and liquid crystal properties: $\Delta\varepsilon=3.0$, $\Delta n=0.127$. Here, in examples using chiral component-introduced liquid crystals (Examples 5 to 8), among the above calculation conditions, $\Delta\varepsilon=3.4$ and $\Delta n=0.14$ were applied for liquid crystal properties. The simulation results are shown in FIG. 31 and FIG. 32. Here, FIG. 31 and FIG. 32 show simulation results of a pixel configuration in which two half pixels were arranged side by side in the vertical direction.

Figure 33:
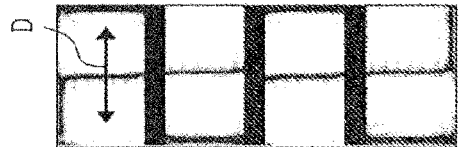
FIG. 33 is a diagram showing a transmittance profile of a part including a dark line in Example 1.
Figure 33:
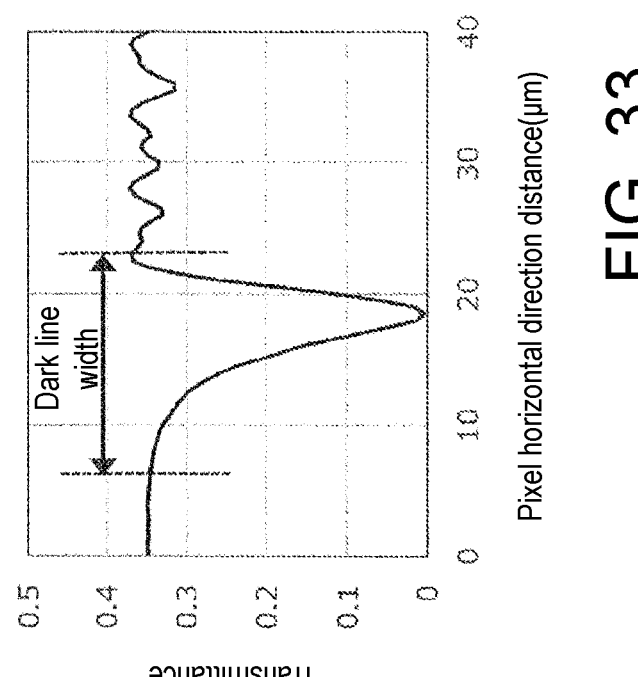

Those whose dark lines were finer compared to Comparative Example 1 and Comparative Example 4 or those whose total dark line lengths were reduced by 30% or more compared to Comparative Example 1 were determined to be "very good (9)." In addition, from the driving state of the liquid crystal display element obtained by simulation, as shown in FIG. 33, a transmittance profile of a part including a dark line was acquired, and when the dark line width was 20 μm or less, it was determined to be "good (○)" and when the dark line width was wider than 20 μm, it was determined to be "poor (x)." Here, FIG. 33 shows the transmittance profile of the part indicated by the arrow D in the liquid crystal display element of Example 1.

(2) Evaluation of Flicker Mitigation

A rectangular wave electric field with a frequency of 60 Hz and an applied voltage of 10 V was applied to the liquid crystal display element at 25° C. for 72 hours. Then, a DC voltage was applied when driving was performed at a rectangular wave field with a frequency of 60 Hz and an applied voltage of 3 V, and it was checked whether there was a DC voltage at which no flicker was confirmed. Here, a liquid crystal display element in which flicker mitigation was confirmed by applying a DC voltage was determined to be "good (○)" and a liquid crystal display element in which flicker mitigation was not confirmed was determined to be "poor (X)."

(3) Evaluation of Response Speed and Variation in Response Speed

An AC voltage of 0 V to 7 V was applied to each of the four domains of the liquid crystal display element, and the time required for the transmittance to increase from 10% to 90% was measured. The measured time was defined as a response speed of each domain. In addition, the response speeds of the four domains were averaged to obtain an average response speed, and the response speed of the liquid crystal display element was evaluated based on the average response speed. Here, when the average response speed was 30 msec. or shorter, it was determined to be "very good (⊚)" when the average response speed was longer than 30 msec. and 50 msec. or shorter, it was determined to be "good (○)" and when the average response speed was longer than 50 msec., it was determined to be "poor (x)". Here. Table 1 also shows the calculated value of the average response speed.

In addition, the variation in response speed of the liquid crystal display element was evaluated based on the difference in response speed between the four domains. Here, when the difference in response speed between domains was 10 msec. or shorter, it was determined to be "good (○)" and when the difference was longer than 10 msec., it was determined to be "poor (x)".

(4) Evaluation of Finger Pushing Resistance

It is known that, when a slit electrode is installed in a liquid crystal display panel with a 4D-RTN alignment, the finger pushing resistance decreases. The alignment of liquid crystal molecules on the side of the TFT substrate in which the slit electrode was provided was determined by the balance between [I] alignment due to the pretilt angle, and [II] the electric field derived from the slit electrode. During finger pushing, the gap between the TFT substrate/the counter substrate became smaller, and in the alignment of liquid crystal molecules on the side of the TFT substrate, the alignment due to [II] electric field derived from the slit electrode was dominant. After finger pushing, the liquid crystal present at the electrode end of the slit electrode returned from the liquid crystal alignment (alignment along the electric field derived from the slit electrode) during finger pushing to the alignment state according to the pretilt angle, and in this procedure, it became parallel to the alignment direction of liquid crystal molecules on the side of the counter substrate, and trapped in a stable state without twisting, and a decrease in transmittance caused by the liquid crystal was thought to remain as uneven finger pushing.

Since the liquid crystal display elements of Examples 1 to 4 had a 4D-ECB alignment and the liquid crystal display elements of Examples 5 to 9 exhibited a twist alignment in a certain direction due to chiral components, the finger pushing resistance was good. On the other hand, since the liquid crystal display element of Comparative Example 2 had a 4D-RTN alignment and a slit electrode, uneven finger pushing occurred and finger pushing resistance was poor in the results.

(5) Exposure Process Evaluation

In the exposure process for alignment division, when a total number of scans on the side of the TFT substrate and the side of the counter substrate was 4, it was determined to be "very good (⊚)" as the liquid crystal display element with excellent throughput, when a total number of scans was 8, it was determined to be "good (○)", and when it was difficult to apply scan exposure, it was determined to be "poor (x)".

TABLE 1

| | Dark line condition | Flicker mitigation | Finger pushing resistance | Variation in response speed | Response speed | Exposure process applicability |
|---|---|---|---|---|---|---|
| Example 1 | ○ fining (17 μm) | ○ | ○ | ○ | ⊚ (13 msec.) | ○ (8 times) |
| Example 2 | ○ fining (16 μm) | ○ | ○ | ○ | ⊚ (22 msec.) | ⊚ (4 times) |
| Example 3 | ○ fining (14 μm) | ○ | ○ | ○ | ○ (34 msec.) | ⊚ (4 times) |
| Example 4 | ○ fining (14 μm) | ○ | ○ | ○ | ⊚ (24 msec.) | ⊚ (4 times) |

TABLE 1-continued

| | Dark line condition | Flicker mitigation | Finger pushing resistance | Variation in response speed | Response speed | Exposure process applicability |
|---|---|---|---|---|---|---|
| Example 5 | ◎ thinning | ○ | ○ | ○ | ◎ (14 msec.) | ◎ (8 times) |
| Example 6 | ◎ thinning | ○ | ○ | ○ | ◎ (13 msec.) | ○ (8 times) |
| Example 7 | ◎ thinning | ○ | ○ | ○ | ◎ (14 msec.) | ○ (8 times) |
| Example 8 | ◎ thinning | ○ | ○ | ○ | ◎ (25 msec.) | ◎ (4 times) |
| Comparative Example 1 | X thickening (23 μm) | ○ | ○ | ○ | ◎ (12 msec.) | ◎ (4 times) |
| Comparative Example 2 | ○ fining (13.5 μm) | ○ | X | ○ | ◎ (12 msec.) | ◎ (4 times) |
| Comparative Example 3 | ○ reduced total length of dark line (reduced by 50%) | X | ○ | X | ◎ (28 msec.) | ◎ (4 times) |
| Comparative Example 4 | X thickening (25.5 μm) | ○ | ○ | ○ | X (114 msec.) | ◎ (4 times) |
| Comparative Example 5 | Predetermined tilt direction and tilt angle could not be exhibited in all crystal domains | | | | | |
| Reference Example 1 | — | — | — | — | — | X (not possible to apply scan exposure) |

As can be clearly understood from the results in Table 1, the liquid crystal display elements of Examples 1 to 8 had finer or thinner dark lines, and also showed good results in all of the flicker mitigation, finger pushing resistance, minimization in variation of the response speed and exposure process applicability.

On the other hand, in the liquid crystal display elements of Comparative Example 1 and Comparative Example 4, the dark line became thicker and in Comparative Example 4, the response speed of the liquid crystal was also slow. In addition, the liquid crystal display element of Comparative Example 2 had poor finger pushing resistance, and the liquid crystal display element of Comparative Example 3 could not sufficiently mitigate flicker and had a large variation in response speed of the liquid crystal. In addition, it can be said that the liquid crystal display element of Reference Example 1 could minimize the occurrence of dark lines based on the simulation results (refer to FIG. 32), but when the liquid crystal display element of Reference Example 1 was desired to be obtained, scan exposure using a conventional exposure device could not be applied, and process characteristics were poor.

The present invention is not limited to the above embodiments, and includes various modifications and alternations within the equivalent range without departing from the spirit and scope of the present invention. Therefore, in light of the above teaching, it can be understood that various combinations and forms, and additionally, other combinations and forms including only one element or more or fewer elements are within the scope and spirit of the present invention.

The invention claimed is:

1. A liquid crystal display device having a plurality of pixels, the liquid crystal display device comprising:
a first substrate including a pixel electrode;
a second substrate which is arranged to face the first substrate and includes a counter electrode;
a liquid crystal layer which is arranged between the first substrate and the second substrate and includes liquid crystal molecules having negative dielectric anisotropy;
a first alignment film formed on the first substrate;
a second alignment film formed on the second substrate; and
a pair of polarizing plates arranged outside the first substrate and the second substrate,
wherein the pixel electrode has slits, and the slits are extending in a direction parallel to an alignment direction of the liquid crystal molecules near the first alignment film or near the second alignment film,
wherein at least one of the first alignment film and the second alignment film is a photo-alignment film whose alignment is divided by performing a plurality of exposures on a photosensitive organic film,
wherein each of the pixels has a plurality of alignment regions in which directions in which a long axis direction of liquid crystal molecules present near a center of the liquid crystal layer in a thickness direction is projected onto the first substrate are different from each other due to the alignment division,
wherein a number of exposures for each of the plurality of alignment regions for the alignment division is plural and same among the alignment regions,
wherein, in each exposure for the alignment division, exposure is performed on two or more alignment regions in an arrangement direction, and previous numbers of exposures in alignment regions to be exposed in each exposure are same among the alignment regions, and
wherein an angle formed by a direction in which the long axis direction of the liquid crystal molecules present near the center of the liquid crystal layer in the thickness direction in each of the plurality of alignment regions is projected onto the first substrate and a direction in which a polarizing axis of the polarizing plate extends is approximately 45°,
wherein one of a pretilt angle defined by the first alignment film and a pretilt angle defined by the second alignment film is less than 90 degrees, and an other is 90 degrees±0.2.

2. The liquid crystal display device according to claim 1, wherein the pretilt angle defined by the second alignment film is less than 90 degrees.

3. The liquid crystal display device according to claim 1, wherein the number of exposures for each of the plurality of alignment regions is 2.

4. A liquid crystal display device having a plurality of pixels, the liquid crystal display device comprising:
a first substrate including a pixel electrode;
a second substrate which is arranged to face the first substrate and includes a counter electrode;
a liquid crystal layer which is arranged between the first substrate and the second substrate and includes liquid crystal molecules having negative dielectric anisotropy;
a first alignment film formed on the first substrate;
a second alignment film formed on the second substrate; and
a pair of polarizing plates arranged outside the first substrate and the second substrate,
wherein the liquid crystal layer contains a chiral agent,
wherein the pixel electrode has slits, and the slits are extending in a direction parallel to an alignment direction of the liquid crystal molecules near the first alignment film or the slits are extending in a direction perpendicular to the alignment direction of the liquid crystal molecules near the second alignment film,
wherein at least one of the first alignment film and the second alignment film is a photo-alignment film whose alignment is divided by performing a plurality of exposures on a photosensitive organic film,
wherein each of the pixels has a plurality of alignment regions in which directions in which a long axis direction of liquid crystal molecules present near a center of the liquid crystal layer in a thickness direction is projected onto the first substrate are different from each other due to the alignment division,
wherein a number of exposures for each of the plurality of alignment regions for the alignment division is plural and same among the alignment regions,
wherein, in each exposure for the alignment division, exposure is performed on two or more alignment regions in an arrangement direction, and previous numbers of exposures in alignment regions to be exposed in each exposure are same among the alignment regions, and
wherein an angle formed by a direction in which the long axis direction of the liquid crystal molecules present near the center of the liquid crystal layer in the thickness direction in each of the plurality of alignment regions is projected onto the first substrate and a direction in which a polarizing axis of the polarizing plate extends is approximately 45°.

5. The liquid crystal display device according to claim 4, wherein one of a pretilt angle defined by the first alignment film and a pretilt angle defined by the second alignment film is less than 90 degrees, and an other is substantially 90 degrees.

6. The liquid crystal display device according to claim 5, wherein the pretilt angle defined by the second alignment film is less than 90 degrees.

7. The liquid crystal display device according to claim 4, wherein the number of exposures for each of the plurality of alignment regions is 2.

8. A method for manufacturing the liquid crystal display device according to claim 1, comprising:
a film formation process in which a photosensitive organic film is formed on at least one of the first substrate and the second substrate; and
a photo-alignment treatment process in which a plurality of exposures are performed on the organic film, and thus a photo-alignment film whose alignment is divided is obtained so that the alignment regions in which directions where the long axis direction of the liquid crystal molecules present near the center of the liquid crystal layer in the thickness direction is projected onto the first substrate are different from each other are formed,
wherein, in the photo-alignment treatment process, exposure is performed such that the number of exposures for each of the plurality of alignment regions for the alignment division is plural and same among the alignment regions, and in each exposure for the alignment division, exposure is performed on two or more alignment regions in the arrangement direction, and the previous numbers of exposures in alignment regions to be exposed in each exposure are same among the alignment regions.

9. A method for manufacturing the liquid crystal display device according to claim 4, comprising:
a film formation process in which a photosensitive organic film is formed on at least one of the first substrate and the second substrate; and
a photo-alignment treatment process in which a plurality of exposures are performed on the organic film, and thus a photo-alignment film whose alignment is divided is obtained so that the alignment regions in which directions where the long axis direction of the liquid crystal molecules present near the center of the liquid crystal layer in the thickness direction is projected onto the first substrate are different from each other are formed,
wherein, in the photo-alignment treatment process, exposure is performed such that the number of exposures for each of the plurality of alignment regions for the alignment division is plural and same among the alignment regions, and in each exposure for the alignment division, exposure is performed on two or more alignment regions in the arrangement direction, and the previous numbers of exposures in alignment regions to be exposed in each exposure are same among the alignment regions.

* * * * *